United States Patent [19]

Krenzer et al.

[11] Patent Number: 4,981,402

[45] Date of Patent: Jan. 1, 1991

[54] MULTI-AXIS BEVEL AND HYPOID GEAR GENERATING MACHINE

[75] Inventors: Theodore J. Krenzer, West Rush; Ernst J. Hunkeler, Fairport; Robert N. Goldrich, Rochester, all of N.Y.

[73] Assignee: The Gleason Works, Rochester, N.Y.

[21] Appl. No.: 104,012

[22] PCT Filed: Aug. 24, 1987

[86] PCT No.: PCT/US87/02083

§ 371 Date: Aug. 24, 1987

§ 102(e) Date: Aug. 24, 1987

[87] PCT Pub. No.: WO89/01838

PCT Pub. Date: Mar. 9, 1989

[51] Int. Cl.$^5$ .............................................. B23F 9/10
[52] U.S. Cl. .................................. 409/26; 364/474.02; 364/474.11; 409/29; 409/51; 409/27
[58] Field of Search .............. 364/192, 474.11, 474.28, 364/474.02; 409/2, 25-27, 29, 38, 39, 41, 51, 53

[56] References Cited

U.S. PATENT DOCUMENTS

| | | | |
|---|---|---|---|
| 3,879,898 | 4/1975 | Loxham et al. | 51/165.71 X |
| 3,984,746 | 10/1976 | Dinsdale et al. | 318/571 |
| 4,211,511 | 7/1980 | Kotthaus | 409/26 |
| 4,370,080 | 1/1983 | Goode | 409/200 |
| 4,565,474 | 1/1986 | Charles | 409/40 X |

FOREIGN PATENT DOCUMENTS 3643967 7/1987 Fed. Rep. of Germany.
724287 3/1980 U.S.S.R. .

OTHER PUBLICATIONS

Shtipelman, Boris A., *Design and Manufacture of Hypoid Gears* (New York: J. Wiley & Sons, 1978), pp. 125–127.

*Primary Examiner*—Steven C. Bishop
*Attorney, Agent, or Firm*—Ralph E. Harper; Robert L. McDowell

[57] ABSTRACT

A computer controlled machine for forming longitudinally curved tooth bevel and hypoid gears having a minimum number of movable machine axes for setup and operation. The movable axes include three rectilinear axes (X, Y, and Z) and three rotational axes (T, W and P). The rectilinear axes are arranged in mutually orthogonal directions. Two of the rotational axes (T and W) provide for rotating tool (26, 27) and work gear (42, 43), respectively. The third rotational axis (P) provides for adjusting the relative angular orientations of tool axis (T) and work axis (W). Pivot axis (P) is positioned with respect to both tool axis (T) and work axis (W) at fixed inclination angles. A method of opeating the computer controlled machine provides for controlling the movable axis (X, Y, Z, T, W, and P) in response to setup and operating parameters of conventional bevel and hypoid gear generating machines.

117 Claims, 11 Drawing Sheets

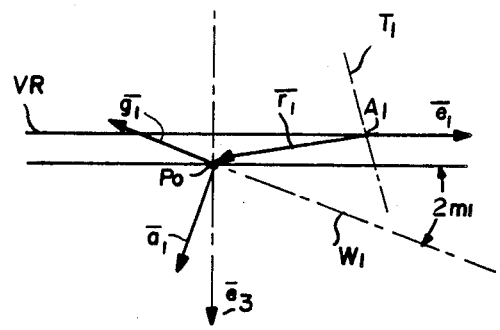
FIG. 11
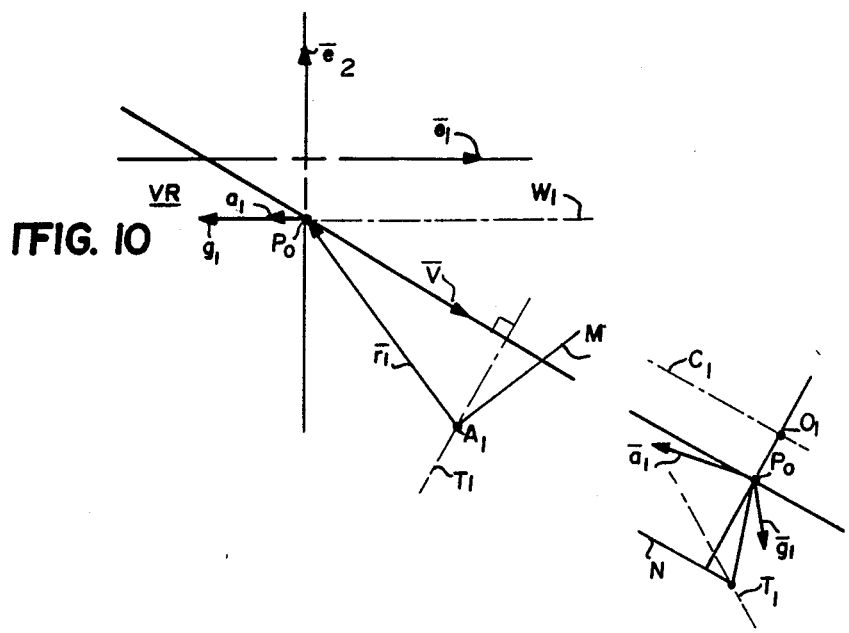
FIG. 10
FIG. 12

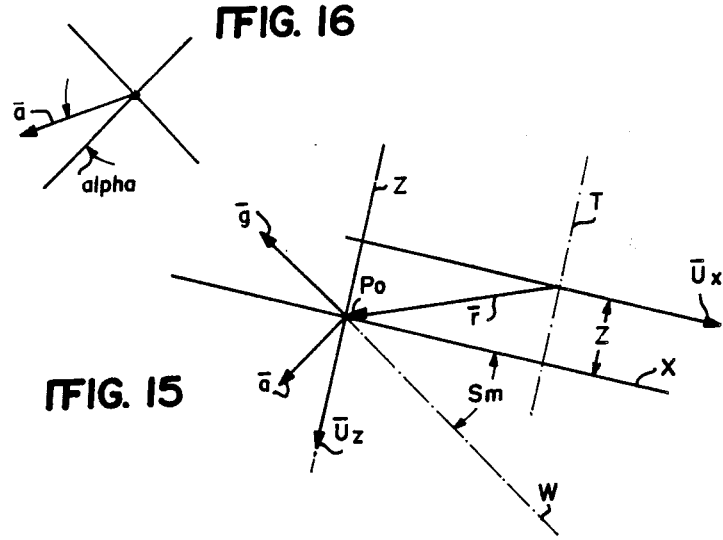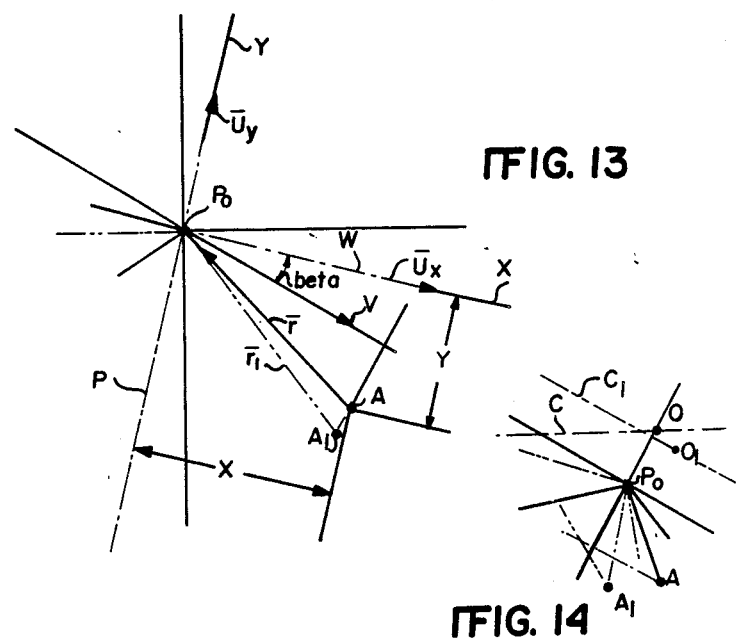

MULTI-AXIS BEVEL AND HYPOID GEAR GENERATING MACHINE

BACKGROUND OF INVENTION

The invention relates to machines and methods for generating longitudinally curved tooth spaces in bevel and hypoid gears. In particular, the invention relates to computer numerically controlled bevel and hypoid gear generating machines and methods whereby a reduced number of movable machine axes are provided for setup and operation.

In the context of the present invention, the phrase "bevel and hypoid" is understood to mean either or both types of gears because of a lack of agreement in the art concerning the use of either term (bevel or hypoid) as generic to the other. Accordingly, whether bevel gears are considered a specific type of hypoid gears or visa versa, the present invention contemplates machines and methods for forming longitudinally curved tooth surfaces of either or both gear types.

Machines for generating bevel and hypoid gears are generally arranged to carry cutting or grinding tools in a manner which permits the tools to represent a mating gear member in mesh with a work gear being produced. For example, it is understood in the art that if both members of a mating pair of work gears are separately manufactured with tools representing complementary theoretical generating gears in mesh with each work gear member, the manufactured work gears will mesh properly with each other.

According to usual practice, tooth surfaces of one or both members of a mating work gear pair are manufactured by a relative rolling process with a tool as though the work gear were in mesh with a theoretical generating gear represented by the tool. Such generating processes, however, are quite time consuming and it is often preferred to generate only one member of a gear pair. For example, many bevel and hypoid gear pairs used in automotive applications are manufactured according to a process in which tooth surfaces of a first gear member (usually a ring gear) are formed without generation (i.e., the tool is oriented to represent tooth surfaces of a stationary theoretical gear and work gear tooth spaces adopt the form of tooth represented by the tool) and the tooth surfaces of the other gear member (usually a pinion) are generated using a tool which is oriented to represent tooth surfaces of the first formed gear member in mesh with the other gear member.

For purposes of economy, two types of gear making machines have evolved for producing different members of work gear pairs where only one member of the pair requires generation. Those machines which are arranged to represent the rolling motion of a theoretical generating gear in mesh with a work gear are referred to as "generating machines" and those machines which are arranged to represent a stationary theoretical gear are referred to as "non-generating machines." Generating machines are required to impart additional motions and, therefore, are much more complicated and expensive than non-generating machines. A significant cost savings is associated with the use of less expensive non-generating machines to produce one member of each gear pair. Generating machines may be used to manufacture non-generated tooth gears but non-generating machines do not include required settings and controls to manufacture generated tooth surfaces.

Typical bevel or hypoid gear generating machines include a machine base and separate supports resting on the base for mounting a work gear and a rotating tool. The tool support is arranged to carry a rotary tool in a manner which represents a theoretical generating gear positioned to mesh with the work gear. A machine cradle is journaled in the tool support so that its axis of rotation represents the axis of the theoretical generating gear. A rotary tool, having stock removing surfaces which represent one or more teeth in the theoretical generating gear, is supported on the front face of the cradle. In particular, the rotary tool is mounted on a tool spindle which is journaled in a tilt mechanism carried by the cradle. The tilt mechanism is used to adjust the angular position of the rotary tool axis with respect to the cradle axis so that the stock removing surfaces of the tool are oriented to appropriately represent the position of gear teeth on the theoretical generating gear.

The work gear support generally includes means for adjusting the mounting position of the work gear so that the work gear will fit into mesh with the theoretical generating gear represented by the tool support. The work gear is journaled for rotation in the work support and means for rotating the work gear interconnect with means for rotating the machine cradle so that the work gear may be rotated in a timed relationship with the rotation of the cradle. Tooth sides are generated in the work gear by imparting a relative rolling motion between the tool and work gear as though the work gear were in mesh with another gear member (i.e., the theoretical generating gear) having an axis of rotation coincident with the machine cradle axis and mating tooth surfaces represented by the stock removing surfaces of the tool.

The rotary tool may be arranged to represent a single tooth in a generating gear or may include a number of stock removing surfaces which are specially positioned on the tool body for timed rotation with the work gear to represent a generating gear with a plurality of teeth.

"Intermittent indexing" processes are associated with the use of a rotary tool which is designed to represent a single tooth of a generating gear. According to the known practice of intermittent indexing, each successive tooth space is formed one at a time until all of the desired number of tooth spaces are formed in the work gear. For example, generating motions in which the tool is rotated about the cradle axis in a timed relationship with work gear rotation are performed independently for each tooth space.

A second well known gear making process, known as "continuous indexing", uses a rotary tool arranged with a number of stock removing surfaces which are positioned on a tool body to represent a plurality of teeth on the generating gear. According to this known practice, the work gear is rotated in a timed relationship with the rotation of the tool so that all of the tooth spaces in the work gear are collectively formed. Required generating motions are superimposed on this timed relationship so that an additional amount of work gear rotation is imparted in a timed relationship with machine cradle rotation. Since all of the work gear tooth spaces are treated collectively, only a single rotation of the tool about the cradle axis through the space of one tooth of the theoretical generating gear is required to completely generate all work gear tooth surfaces.

A discussion of the basic machine requirements of bevel and hypoid gear manufacture is found in Chapter 20 of *Gear Handbook, The Design, Manufacture, and*

*Application of Gears,* Darle W. Dudley, Editor, Copyright 1962 by McGraw-Hill, Inc., Library of Congress Catalog Card Number: 61-7304. Pages 1 through 11 of the cited chapter entitled "Bevel- and Hypoid-Gear Manufacture" are hereby incorporated by reference for purposes of indicating the background of invention and illustrating the state of the art.

For purposes of additional background, it may be appreciated that for a number of years, advances in the computer and electronics industry have been routinely applied to machine tools. In fact, most state-of-the-art machine tools now include some sort of computer control. Such machines are referred to in the industry as computer numerically controlled machines or "CNC" machines. It is well known, for example to use computers to control both machine operation and setup. Computers also enable a series of machines performing separate functions to work together in a system to perform many different operations on work pieces and to produce a number of different work pieces without requiring substantial manual intervention.

Although conventional bevel and hypoid type gear generating machines have been recently fitted with computer controls, mainly for monitoring and controlling machine operation, much of the set up of these machines still requires manual intervention. For example, U.S. Pat. No. 3,984,746 discloses a "master-slave" servo-system for replacing certain gear trains in a conventional bevel and hypoid gear generating machine which control relative machine motions during use. However, much of the setup of the modified machine still requires substantial manual intervention.

Conventional bevel and hypoid gear generating machines (i.e., those described in the above-referenced Gear Handbook) require nine or more machine settings (also known as "setup axes") for appropriately positioning the tool with respect to the work gear. These settings include: (a) an angular setting of the cradle, (b) three angular settings of the tilt mechanism, (c) a rectilinear feed setting between the tool and work supports, (d) a rectilinear setting of work gear height above the machine base, (e) an angular setting of the work gear axis, (f) a rectilinear setting of the work gear along its axis, and (g) for certain cutting methods, relative settings of the rotational positions of the tool and the work gear. These settings are difficult to make to required accuracy and are time consuming. Most of these settings are accomplished manually because the large number of settings and their often congested locations render computer control of these settings extraordinarily complex and/or prohibitively expensive.

For example, known tool tilt mechanisms on bevel and hypoid gear generating machines are associated with a number of particularly difficult settings. These settings are made to incline and orient the tool axis with respect to the cradle axis so that the stock removing surfaces of the tool are positioned to appropriately represent tooth surfaces of the theoretical generating gear. Three coordinated settings known in the art as "eccentric angle", "swivel angle" and "tilt angle" are usually required for this purpose.

The tool drive which acts through the tilt mechanism also involves an extraordinary amount of complexity. This drive is required to impart rotation to the tool at variable angular orientations and positions with respect to the cradle axis. Thus, both the complex settings of the tool tilt mechanism and the tool drive at variable orientations take place within the space of the machine cradle which is itself rotatable.

Accordingly, machine cradles tend to be quite large and cumbersome. The diameter of the theoretical generating gear represented by the tool support is also substantially determined by the diameter of the machine cradle. For example, a 60 centimeter diameter cradle may be required to support a rotary tool in position to represent tooth surfaces of a 30 centimeter diameter theoretical generating gear. Machine cradles are difficult to manufacture and mount to required precision, and account for a significant portion of the size, weight and cost of conventional generating machines. It has been proposed on occasion to replace the customary machine cradle with a pair of rectilinear slides. For example, FIG. 20-7 on page 8 in the incorporated chapter of "Gear Handbook" illustrates this possibility for non-generating machines. As explained therein, non-generating machines require positioning of a tool axis with respect to a work gear axis in the manner of a machine cradle but they do not require any motion of the tool axis equivalent to cradle rotation. Thus, it may be readily understood that the just-mentioned slides may be used to move a tool axis to the same position otherwise effected by a cradle in non-generating machines. This general concept has also been proposed for bevel and hypoid generating machines in SU, A, No. 724287 (V. A. KONDYURIN) and DE, A, No. 36 43 967 (YUTAKA SEIMITSU KOGYO K.K.). In the proposed machines disclosed in these patents, the customary machine cradle is replaced by a pair of rectilinear slides which can be controlled to move the tool axis along an arcuate path corresponding to cradle rotation during generation.

However, neither of these proposed generating machines suggests any means for inclining the tool axis with respect to their intended representation of the customary cradle axis. In fact, even if a known tool axis tilt mechanism were to be added to either of the proposed machines, the arcuate translation of an inclined tool axis along the rectilinear slides of the proposed machines would not reproduce the rotational motion of the inclined tool axis about the cradle axis of a conventional machine. In other words, translation of an inclined axis about another axis to which it is initially inclined, is not the same as rotation of the inclined axis about another axis.

Thus, neither of the proposed generating machines disclosed in the patents just referred to above is appropriate for manufacturing the variety of gears traditionally produced by conventional bevel and hypoid generating machines which utilize large machine cradles and complex tilt mechanisms for appropriately positioning and operatively engaging a tool and work gear. Furthermore, even when generating without any provision for tool axis tilt, neither of the proposed machines appears to account for the change in angular position of the tool about its axis which should accompany their respective translational representations of cradle axis rotation, and the lack of such a change in angular position would undesirably affect the required timed relationship between tool and work rotations during continuous indexing operations.

Another known alternative configuration for a computer controlled bevel and hypoid- gear generating machine operates according to a different method and is disclosed in U.S. Pat. No. 4,565,474. This machine uses a CNC system for controlling machine axes for purposes of both setup and operation. However, even for the generation of only one of the flanks of longitudinally curved tooth spaces, the machine requires a large number of movable axes for setup and operation. Of these required axes, the most difficult and expensive ones to control are rotational (or pivot) axes for angularly moving the tool and work gear axes with respect to each other. For the generation of a single flank of longitudinally curved tooth gears, the machine includes a first axis for pivoting the tool with respect to the work gear, a second axis for pivoting the work gear with respect to the tool, and a tool tilt mechanism (e.g., the mechanism of U.S. Pat. No. 4,370,080) for inclining the tool with respect to a third axis. These three just-named axes are in addition to axes for rotating the tool and work gear, and also in addition to three rectilinear axes of relative movement between the tool and work gear. If the other flank of the tooth spaces is to be generated simultaneously, a second tool is required along with further additional axes for rotating and pivoting the second tool, two more rectilinear axes for moving the second tool with respect to the work gear, and presumably, a second tool axis tilt mechanism.

The machine disclosed in U.S. Pat. No. 4,565,474 operates according to limit conditions in which a single generating line of constant shape (e.g., analogous to a straight or curved rigid wire) is used to generate ruled tooth surfaces. The generating line is defined by an intersection of the stock removing surface swept by a rotating tool with a plane of action which comprises a locus of points of contact between the tool and work gear. The tool penetrates the plane of action at a fixed depth, and the constant shape generating line in the plane of action is rotated about an axis perpendicular to the plane in a predetermined relationship with rotation of the work gear in a manner such that the plane of action rolls together with a base cone surface of the work gear. Generated thereby in the plane of action is a ruled tooth surface defined by relative movement of the constant shape generating line with respect to the work gear.

These limitations which define the method of U.S. Pat. No. 4,565,474 prevent the disclosed machine from duplicating tooth surfaces now being provided by conventional machine motions which represent the rolling motion of a theoretical generating gear in mesh with the work gear. Conventional machine motions provide for rotating the tool about the axis of a theoretical generating gear (i.e., cradle axis) which defines a relative path of movement between the tool and work gear that is disposed angularly with respect to the plane of action between them. Contact between the tool and work gear progresses along various points on the tool's stock removing surface which is itself inclined to a normal (perpendicular) of the plane of action by a pressure angle corresponding to the generating gear tooth surface represented by the tool. Thus, the tool according to conventional methods is moved along a path inclined to the plane of action, penetrating the plane of action at changing depths along a tool surface also inclined to a normal of the plane of action, thereby generating tooth surfaces, not by a single generating line of constant shape, but rather, by an enveloping process in which the generated tooth surfaces are defined by the stock removing surface of the tool and its relative motion with respect to the work gear. Also, since the stock removing surfaces of tools used in conventional machines are inclined to the plane's normal and moved angularly with respect to the plane of action, it is possible to simultaneously generate both flanks cf tooth spaces in a work gear with a single tool arranged to represent both flanks of a generating gear tooth.

Another important consideration relating to the generation of longitudinally curved tooth bevel and hypoid gears is the determination of appropriate setup and operating parameters for such machines. Because of the complexity of tooth surfaces formed by conventional bevel and hypoid generators, such tooth surfaces can only be exactly defined geometrically by the machine motions which are used to produce them. That is, although certain general parameters of gear design may be specified, e.g., tooth numbers, pitch angle, etc., the equations which are used to define bevel and hypoid tooth surfaces are the motion equations of generating machines. Since tooth surfaces are not defined independently of machine motions, the design of tooth surfaces is often an iterative type of process known in the art as "development."

Much know-how has been accumulated, particularly in the form of computer software, for developing tooth surfaces by appropriate adjustment of the operating parameters of conventional bevel and hypoid generating machines.

It should be appreciated that much of this extremely valuable, painstakingly accumulated know-how would be of little use in controlling the operation of non-conventionally configured machines which require different operating parameters for controlling machine motions. Instead, such alternatively configured machines would require new sets of formulas and other know-how to determine appropriate machine settings and operating parameters for producing known gear tooth geometry and mating characteristics. For example, a machine described in an article in the July 1983 issue of American Machinist magazine on pages 85 through 88, entitled "Generating Gears Via Software," describes such a method for determining the operating parameters of a non-conventionally configured machine. (The machine referred to in the article appears related to the machine disclosed in U.S. Pat. No. 4,565,474.)

It will be appreciated that the determination of such appropriate machine settings and operating parameters, based on general information of desired tooth geometry and mating characteristics, corresponds to the above-mentioned process of development utilized with conventional machines. While it may be relatively practicable to add software to a CNC machine for determining such required machine motions for producing easily defined straight tooth gears, the additional complexity of longitudinally curved bevel and hypoid gear teeth, particularly those which are produced by conventional generation, would require extensive and complicated developments that would add considerable cost and complexity to any CNC system which otherwise is primarily responsible for controlling machine motions along prescribed paths.

Further, little or no benefit would be derived from the large amount of existing know-how which relates such desired tooth geometry and mating characteristics to conventional machine settings. This is particularly true of "higher order" modifications which are expressed directly in terms of known machine motions or in terms of a theoretical generating gear.

In general, it is already known from U.S. Pat. No. 3,984,746 to incorporate computer numeric controls in conventional bevel and hypoid generating machines for automatically setting up and operating certain of their movable machine axes. However, the large number and congested locations of the conventional machine axes makes the application of computer controls to all of these axes especially complicated and expensive. Although it is also known from SU, A, No. 724287 and DE, A, No. 36 43 967 to replace the large and cumbersome machine cradle of conventional machines with a pair of rectilinear slides, neither of these two proposals discloses any means for inclining the tool axis with respect to the original cradle axis or for replacing the rotational function of the conventional machine cradle in so far as the latter rotates the inclined tool axis about the cradle axis. Further, the computer controlled gear generating machine of U.S. Pat. No. 4,565,474, which includes a much different configuration of machine axes, still requires a large number of controlled axes for generating longitudinally curved tooth gears. Also, the disclosed method of controlling these axes undesirably limited to the generation of ruled surfaces and does not benefit from accumulated know-how relating to development of tooth designs producible on conventional machines. Finally, none of the known art, considered separately or in combination, suggests any means whereby the conventional arrangement of a tool tilt mechanism carried on a machine cradle can be entirely replaced by computer controlled axes arranged in a more simplified configuration.

SUMMARY OF INVENTION

The present invention is concerned with a novel gear generating machine and method of use which apply the conventional principles of gear cutting and grinding in an entirely new way. The machine configuration is greatly simplified with respect to bevel and hypoid gear generating machines of the prior art and is readily adaptable to computer controls for automatically setting up and operating the machine.

The machine of the present invention is arranged for controlling the relative positions of the tool axis and work gear axis using a minimum number of movable machine axes. According to the usual practice, the tool and work gear are each rotatable about their respective axes. However, in contrast to known bevel and hypoid gear generating machines, only a single pivot axis is used for adjusting the relative angular positions of the tool and work gear axes for setup and operation. Three additional axes are provided for adjusting the rectilinear positions of the tool and work gear.

The significance of this important reduction in movable machine axes may be appreciated with reference to conventional non-generating machines. It is possible to arrange the generating machine of the present invention with no additional movable axes over those ordinarily used on non-generating machines. In other words, the additional cost and complexity associated with such movable structures as machine cradles and tilt mechanisms has been obviated. Further, this reduction is of a type that does not require the use of multiple tools and pivot axes or any limitations to the method of generation.

Although six axes of relative movement between the tool and work gear are ordinarily required for purposes of setup and operation, only five axes of movement are timed with respect to each other during intermittent indexing operations. These are (a) movement along three rectilinear axes, (b) angular movement about a single pivot axis and (c) rotational movement about the work gear axis. Continuous indexing operations, however, require timed relationships between all six movable axes. In addition to the just-mentioned axes associated with intermittent operations, continuous indexing operations also require interdependent control over the rotation of the tool about its axis.

The present invention also provides that the same controlled axes of machine motion are used for purposes of both setup and operation. Thus, with respect to known bevel and hypoid gear cutting machines the total number of movable machine axes used for purposes of setup and operation is reduced from nine or more to only six. This reduction enables the machine of the present invention to be readily equipped with computer numeric controls for automating machine setup and operation. In addition, despite a reduction in the total number of setup axes, the machine of the present invention has increased versatility. For example, the machine of the present invention is intended for producing a wider range of work gear sizes and designs having more possibilities for developing the exact tooth surfaces which may be desired.

The relationship of a theoretical generating gear in mesh with a work gear is maintained in the present invention by a single angular adjustment between the tool and work gear axes in combination with relative rectilinear movements between the tool and work gear axes along three rectilinear axes and rotational movement of the work gear about its axis. In the case of continuous indexing operations, rotational movement of the tool about its axis is also controlled. Either the tool axis or the work gear axis may be positioned in a fixed angular orientation with respect to the machine and the axis of the theoretical generating gear may be allowed to vary in angular orientation with respect to the machine base to maintain the desired relative rolling relationship between the tool and work gear. For example, the tool axis may be mounted in a fixed angular orientation with respect to the machine and the position of the theoretical generating gear axis may be instantaneously defined in virtually any desired angular setting with respect to the tool axis and maintained in this relative angular setting by relative motions of the tool and work gear axes.

A range of relative angular orientations between the tool and work gear axes is provided by positioning the pivot axis at particular inclinations with respect to the tool and work gear axes. For purposes of both setup and operation, both the tool axis and work gear axis are maintained at fixed inclinations with respect to the pivot axis. The inclinations are measured as included angles between directed line segments associated with the pivot axis and each of the tool and work axes. The maximum angular separation between the tool and work gear axes is determined by the sum of the respective angles of inclination each of these axes makes with the pivot axis. The minimum angular separation between the two axes is determined from the absolute value of the difference between the same respective angles.

It is preferred that the respective fixed angles of inclination the tool and work gear axes make with the pivot axis are each equal to ninety degrees. By positioning the pivot axis perpendicular to both the tool and work gear axes, a substantially unlimited range of angular variation between the tool and work axes is possible. Further, the amount of angular relative travel of either axis about the pivot axis for achieving a given angular separation is minimized.

It is also preferred to position the pivot axis so that it intersects both the tool and work gear axes in a position along the work gear axis which can be selected to minimize travel requirements of the remaining rectilinear axes. For example, the pivot axis may be selected in the vicinity of a given work gear.

According to one version of the present invention, the novel machine includes the traditional features of a machine base and work and tool supports mounted on the base. The tool support includes a carriage which is mounted on slides formed in the base to permit movement of the carriage along the width of the base. A tool head is carried on slides formed in the carriage to permit movement of the tool head vertically with respect to the base, and a tool spindle is journaled in the tool support for mounting and rotating a tool about its axis.

The work support includes a table which is mounted on ways formed in the base to permit movement of the table along the length of the base. A work head is mounted on arcuate ways formed in the table to permit angular movement of the work head about a pivot mounted in the table, and a work spindle is journaled in the work head for mounting and rotating a work gear.

Relative movements of the tool and work gear along the specified axes are controlled by separate drive motors associated with each of the axes. One group of drive motors is provided for imparting relative rectilinear motions between the tool head and work head along three mutually orthogonal axes. These motions include movement of the carriage across the width of the base, movement of the tool head vertically of the base, and movement of the work table along the length of the base. A second group of drive motors is provided for imparting rotation to the tool spindle and work spindle. A separate motor is also provided for controlling the angular position of the work head on the work table with respect to the tool support. Each of the drive motors may be controlled by a computer so that a relative rolling movement between the rotary tool and the work gear fulfills the kinematic requirements of a theoretical generating gear in mesh with the work gear.

It is important to note that the known functions of the machine cradle and tilt mechanism have not merely been replaced by alternative structures which independently perform the same former functions, but that wholly new coordinated motions are provided along and about the geometrically defined machine axes to appropriately present the tool to the work gear in a manner which continues to represent a theoretical generating gear in mesh with the work gear. For example, although the rectilinear motions of the tool carriage across the width of the base and tool head perpendicular to the top face of the base may be used to represent the former arcuate motions of the tool about a cradle axis, such simple arcuate motion would not appropriately position the tool spindle for most purposes of the present invention. In fact, in those instances in which the theoretical generating gear was formerly defined by some measure of tool axis tilt, simple arcuate motion reproduced by the combined rectilinear motions of the tool carriage across the width of the base and tool head perpendicular to the top face of the base would lead to inaccuracies in the work gear (i.e., would not fulfill the kinematic requirements between the theoretical generating gear and work gear). However, according to the present invention, the combined rectilinear motions of the tool carriage and tool head may be used to carry the rotary tool along virtually any curvilinear path which may be required.

Instead of inclining the tool axis with respect to a fixed cradle axis to achieve a desired orientation of tooth surfaces on a theoretical generating gear in accordance with conventional teaching, the present invention provides for specially timed motions between the tool and the work gear to define a desired orientation of the generating gear axis with respect to a fixed angular orientation of either the tool axis or work gear axis. Although the tooth surfaces of the theoretical generating gear, represented in the plane of tool rotation, include a fixed angular orientation with respect to the machine base in the case of a fixed tool axis orientation, the present invention provides for a substantially unlimited variation in the relative orientation of tooth surfaces on the theoretical generating gear by modifying the angular position of the generating gear axis. Similarly, in the case of a fixed work gear axis orientation, angular movement of the tool axis about a single pivot axis in combination with the relative rectilinear movements between the tool and work and rotational movements of the work gear about its axis may be used to define a substantially unlimited variation in the relative orientation of tooth surfaces on the theoretical generating gear having an axis of rotation which varies in angular orientation with respect to the machine base.

Thus, the starting point for defining the theoretical generating gear according to the present invention is the fixed angle orientation of either the tool axis or work gear axis. The selected axes for controlling the relative positions of the tool and work gear provide the minimum geometric freedoms required for effecting any desired relative positions within the physical limitations of the machine. The exact same relative motions of a conventional gear generating machine may be represented by relatively moving the tool and work gear in the same kinematic relationship whereas either the tool axis or the work gear axis of the present invention is fixed in angular orientation with respect to the machine base.

It may be appreciated, for example, that if the tool axis of the present invention is positioned at a fixed orientation, whereas the conventional tool orientation of the prior machine is inclined thereto and the same relative positions between the tool and work gear are desired at the new fixed orientation, the work gear of the present invention must also be moved to a new orientation. This may be shown by relatively simple geometric construction. Likewise, at each successive instant of machine operation the relative orientations of the tool and work gear of conventional gear generating machines may be represented by new orientations of the tool and work gear with respect to the base of the new machine.

Differences between the operation of known bevel and hypoid gear generating machines and the present invention go well beyond the obviation of certain machine control axes and the addition of others. Even those axes which are controlled in common with conventional machines perform different functions. For example, although it is known for continuous indexing operations to rotate the work gear in a fixed ratio with respect to the rotation of the tool, the present invention also provides for rotating the work gear by an additional incremental amount to accommodate movement of a theoretical generating gear out of a single plane of rotation. In addition, although it is known to position the work head at various angular orientations for set up purposes, it is an important feature of one version of the present invention that the angular orientation of the work head is varied during operation to fulfill the kinematic positioning requirements of the rotary tool and work gear.

It is also an important feature of the present invention that input parameters associated with the setup and operation of conventional bevel and hypoid generating machines may be used to control the setup and operation of a machine having a different configuration. In particular, the present invention provides for inputting a series of conventional operating parameters and transforming this information by calculation into a form appropriate for specifying the required positions of differently configured machine axes. In this way, accumulated know-how concerning the development of tooth surfaces on conventional machines may be readily applied to the machine of the present invention. Other advantages include a great reduction in the number of machine calculations required to determine prescribed paths of motion for movable machine axes and the preservation of user familiarity with the parameters of machine setup and operation.

A computer having a microprocessor is arranged to receive conventional input instructions interactively with an operator through a keyboard and CRT (cathode ray tube), or indirectly from a storage medium. The operation of the microprocessor and appendant devices is controlled by a computer program. The program also includes a series of instructions for transforming input information relating to the operating positions of a conventional generating machine into a form which specifies the required positions of each axis of the new machine.

The transformation requires (a) the definition of a coordinate system for the new machine relative to the coordinate system of the conventional machine and (b) the application of well known mathematical techniques (e.g., matrix operations, vector transformations and trigonometric functions) to reference the same relative positions of the tool and work gear in the coordinate system of the new machine.

The coordinate system of the new machine may be defined, for example, by selecting one of the coordinate axes of the system at predetermined angular inclinations to both the tool and work gear axes coincident with a pivot axis of the new machine and defining the remaining orthogonal coordinate axes as desired with respect to horizontal or vertical orientations of the new machine. Preferably, the pivot axis is positioned perpendicular to both the tool and work gear axes, but other positions are possible so long as the maximum and minimum angular separation of the tool and work gear axes defined for the conventional machine falls within a range defined by the sum and difference of the angles of inclination formed between the pivot axis and each of the oriented work and tool axes. For further convenience, it is desirable to orient the rectilinear axes of the new machine coincident with the orthogonal coordinate axes defined for that machine.

In particular, the tool axis and work gear axis of a conventionally arranged machine may be rotated together so that the one of the two axes which is to be positioned in a fixed angular orientation on the new machine also defines a predetermined angular inclination with a pivot axis of the new machine and the other of the two axes which is rotatable about the pivot axis defines, in positions of rotation about the pivot axis, a desired range of angular separation between the tool and work gear axes. Preferably, of course, both the tool and work gear axes are positioned perpendicular to the pivot axis. In that case, an orthogonal coordinate system may be conveniently defined with the pivot axis considered coincident with one of the new coordinate axes, and the remaining two orthogonal axes defined in the plane of angular movement about the pivot axis so that the fixed one of the tool and work gear axes extends in one of the remaining coordinate directions. The rectilinear machine axes may be arranged in each of the coordinate directions to minimize further calculations. In this way, the same relative positions of the tool and work gear on a conventional machine (i.e., one having an angularly adjustable cradle axis, work axis and tool axis) may be represented by a different machine in which only the tool or work axis is angularly adjustable.

A separate transformation is required for each increment of the generating motion of a conventional machine. These transformations may be calculated during operation or in advance of intended operations and stored for later use (e.g., in so called "look up" tables). Once the desired positions of the axes are calculated, control signals representing these calculated positions may be output from the microprocessor for controlling drive motors associated with each movable machine axis. In accordance with conventional practices of CNC systems, the actual positions of machine axes may be measured by encoders and the drive motors are controlled by the microprocessor to correct any differences between the actual and desired positions of associated machine axes.

In contrast to conventional machines in which it is possible to easily imagine the rotation of a theoretical generating gear about a fixed cradle axis, the present invention provides for kinematically defining a theoretical generating gear whose axis may be oriented at any number of different positions which may vary during operation of the machine. However, by using the same input parameters as a conventional machine, the accumulated know-how relating to subtle changes in the position and orientation of tooth surfaces on a theoretical generating gear for developing exact work gear tooth geometry may also be applied to the machine of the present invention.

In addition, by eliminating the requirement of a machine cradle and complex tilt mechanism for controlling the angular orientation of the tool axis, the present invention provides for a much smaller and less complex gear generating machine. It is also important to note that in known gear generating machines only a limited range of tool tilt can be accommodated by known tilt mechanisms. The present invention, however, provides for obtaining similar effects on the geometry of manufactured tooth surfaces which are normally associated with such tool inclinations over a virtually unlimited range. Furthermore, virtually all of the motions, adjustments, and features provided on prior art gear cutting machines, many of which are arranged specifically to provide such features, may be accommodated on a single machine having a much simplified arrangement of work and tool supporting structures.

The new machine configuration having a minimum number of CNC axes is also appropriate for positioning a tool with respect to a work gear in an orientation representing the first formed work gear of a pair. Further, it is important that a single tool may be used to represent both flanks of theoretical generating gear tooth surfaces and to simultaneously form both flanks of longitudinally curved tooth spaces in bevel and hypoid gears. The tool may be either a cup type or flared cup type and may be either orbited or oscillated according to known practices for improving contact conditions during use without requiring any additional axes of motion.

Although the machine of the present invention is intended primarily for the generation of longitudinally curved tooth bevel and hypoid gears, the machine may also be used to produce other gear types including nongenerated bevel and hypoid gears and longitudinally curved tooth parallel axis gears. That is, even though the present invention may be best appreciated with respect to known bevel and hypoid type generating machines which embody the most complicated arrangements of movable axes for gear manufacture, the greatly simplified machine arrangement of the present invention may also be readily applied to the production of different gear forms and other less demanding applications.

These and other features and advantages of the present invention will become apparent in the detailed description of the invention which follows. In that discussion, reference will be made to the accompanying drawings as briefly described below:

BRIEF DESCRIPTION OF THE DRAWINGS

FIG. 10 is in the same view as FIG. 7 with the outline of the known machine removed to facilitate the addition of new geometric constructions for rotating the tool and work axes of the known machine into a new orientation;

FIG. 11 is in the same plan view of FIG. 8 with the known machine outline removed but including the new geometric constructions particularly related to work gear position;

FIG. 12 corresponds to the partial view of FIG. 9 without the tool illustration but including the same new geometric constructions particularly related to tool position;

FIG. 13 is in the same view as FIGS. 7 and 10 illustrating rotated positions of the tool and work gear axes in a new coordinate system;

FIG. 14 is in the same partial view of FIGS. 9 and 11 illustrating the new positions of the tool and work gear axes according to the present invention;

FIG. 15 is a view of FIG. 13 taken along a new coordinate axis and defining the new positions of the tool and work gear axes in a plan view of the new machine;

FIG. 16 is a partial view of FIG. 15 taken along the work gear axis and defining an incremental rotation of the work gear accompanying the conversion to the new positions of the tool and work gear axes in the present invention;

DETAILED DESCRIPTION OF PREFERRED EMBODIMENTS

Figure 1:
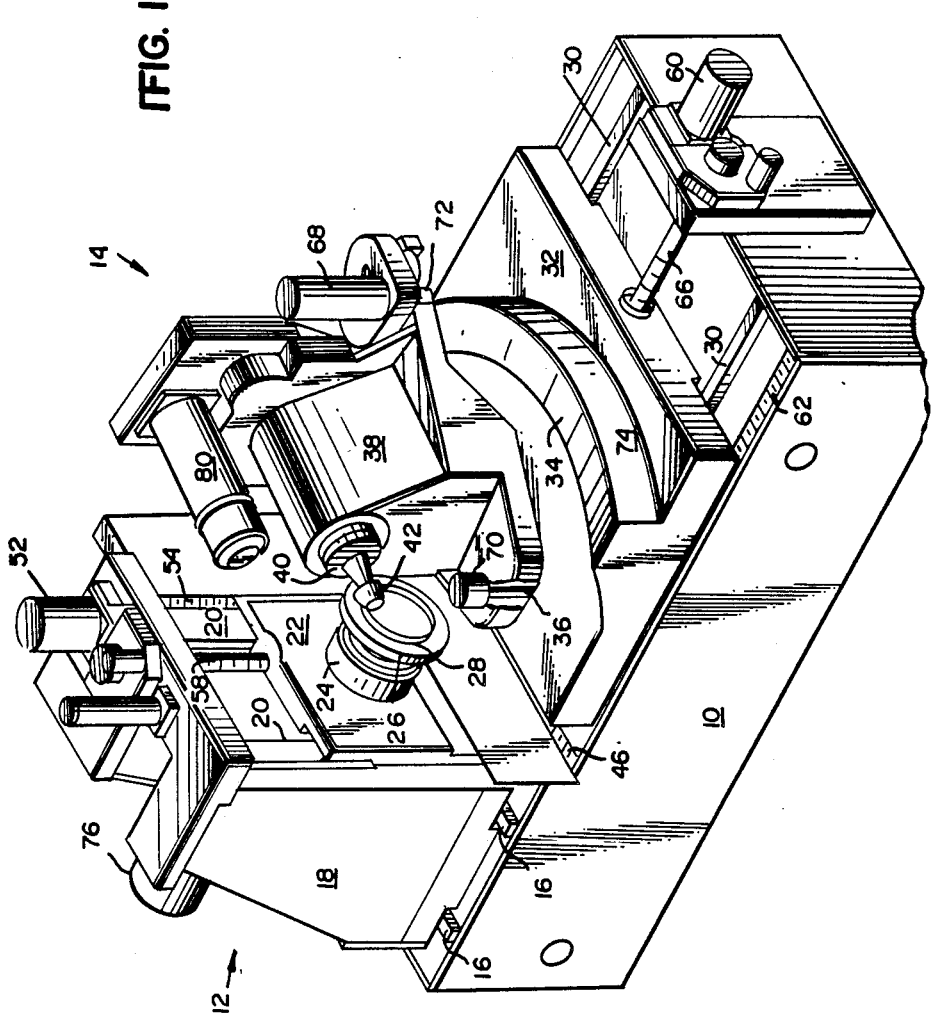
FIG. 1 is a perspective view of the new machine configuration of the present invention.
Figure 2:
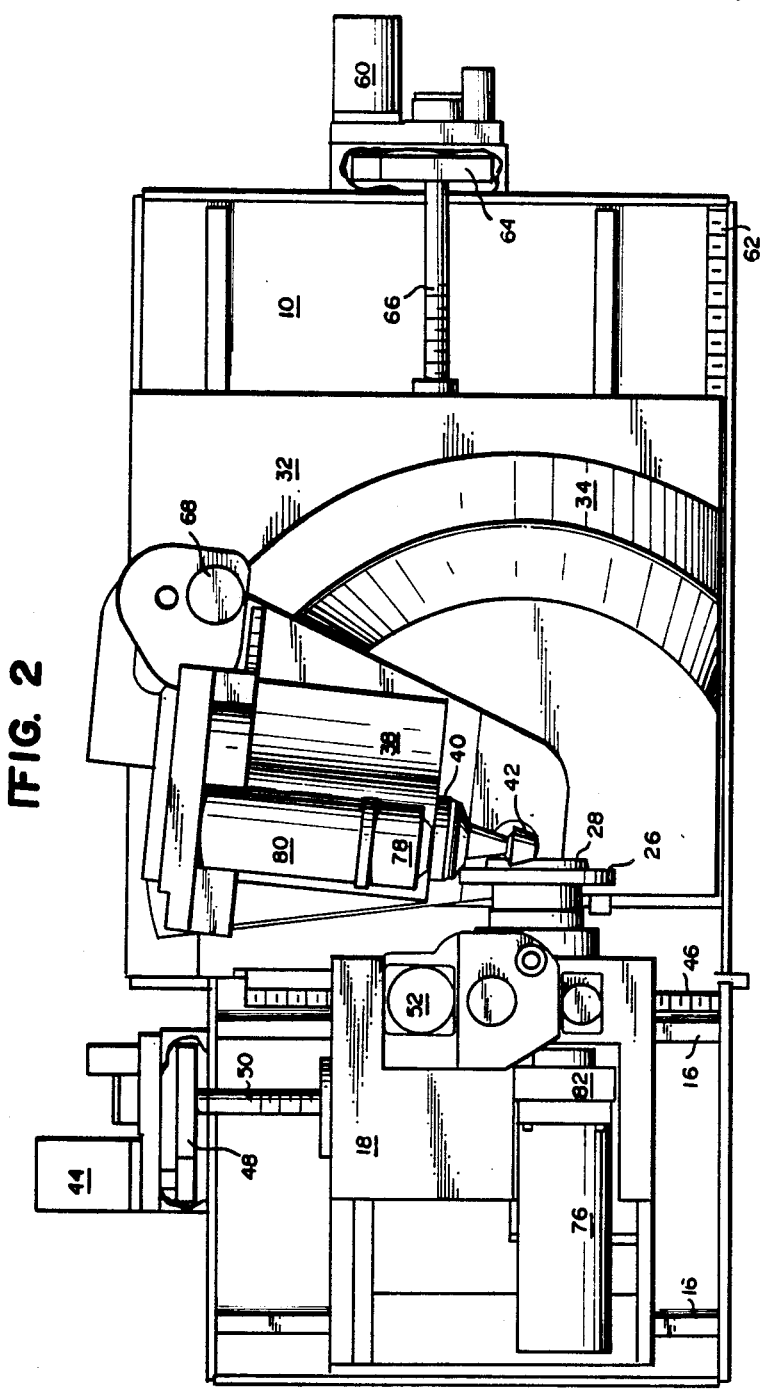
FIG. 2 is a plan view of the same machine illustrated in FIG. 1.

An exemplary bevel and hypoid gear generating machine in accordance with the present invention is illustrated by FIGS. 1 and 2. The machine includes the general features of a machine base 10 with tool support 12 and work support 14 mounted on the base. Tool support 12 includes carriage 18 mounted on slides 16 formed in base 10 to permit rectilinear movement of carriage 18 across the width of base 10. Tool head 22 is carried on slides 20 in carriage 18 to permit movement of tool head 22 vertically with respect to the base. Tool spindle 24 is journaled in tool head 22 for rotatively mounting rotary tool 26 having stock-removing surfaces 28 projecting from a front face of the tool. For purposes of the present invention, rotary tool 26 may be configured as a cutter or grinding wheel of the cup type or flared cup type. The tool illustrated in this embodiment, however, is a cup type tool.

Work support 14 includes table 32 which is mounted on slides 30 formed in base 10 to permit movement of table 32 along the length of the base. Work head 38 is mounted on arcuate slide 34 and pivot 36 on table 32 to permit arcuate movement of work head 38 about pivot 36. Work spindle 40 is journaled in work head 38 for rotatively mounting work gear 42. The illustrated work gear is of the bevel pinion type.

Figure 3:
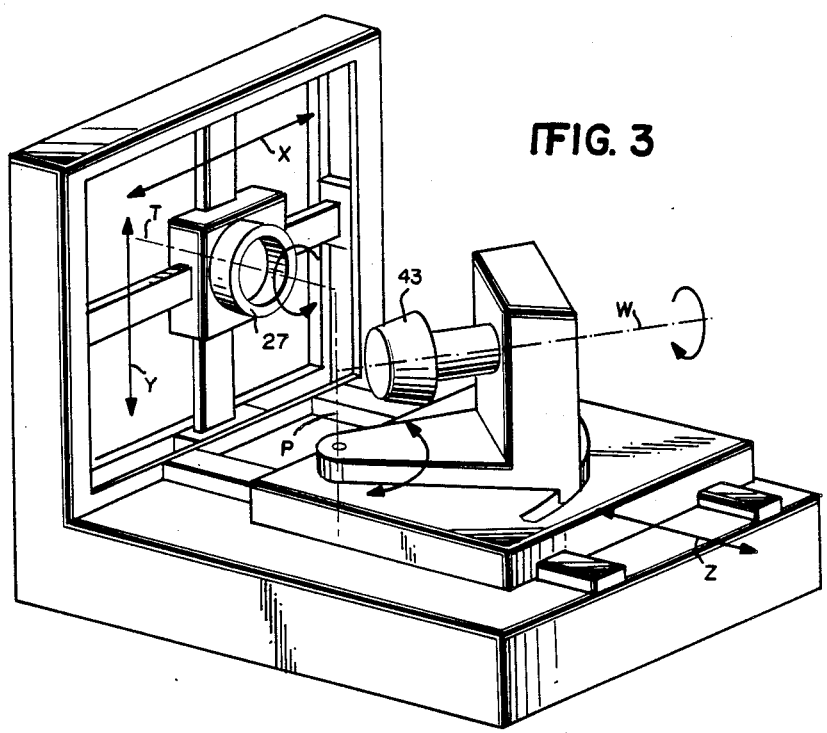
FIG. 3 is a schematic depiction of the same machine with the movable structures of the machine greatly simplified to better illustrate axes of machine movement.

In FIG. 3, the machine of FIGS. 1 and 2 has been schematically depicted to permit a clearer illustration of the directions of movement of each movable axis. Also for this purpose, work gear 43 is shown greatly enlarged and is moved out of engagement with tool 27.

It can be seen from FIG. 3 that tool axis "T" and work axis "W" are relatively movable along three rectilinear axes "X", "Y", and "Z" and about one pivot axis "P." In the illustrated embodiment, axes X, Y, and Z are mutually orthogonal. Work axis W is pivotable about pivot axis P which extends in direction Y perpendicular to both work axis W and tool axis T. Pivot axis P intersects work gear axis W in a position along work axis W in the vicinity of work gear 43. Rotary tool 27 and work gear 43 are each rotatable about their associated axes T and W which pass though the respective centers of the tool and work gear.

Comparison of these movable axes may now be made with the more detailed illustration of the embodiment according to FIGS. 1 and 2. For example, it may now be understood that axes T and W correspond to the axes of rotation of rotary tool 26 and work gear 42 on tool spindle 24 and work spindle 40, respectively. Movement of carriage 18 across the width of base 10 corresponds to movement of tool axis T in direction X. Similarly, movement of tool head 22 vertical of the base and movement of work head 38 along the length of the base correspond to respective movements of tool axis T in direction Y and work axis W in direction Z. Pivot axis P may be understood to extend through pivot 36 on table 32 in a direction parallel to the movement of tool head 22 in direction Y.

Movement along each of the rectilinear slides is imparted by respective drive motors which act through speed reducing gearing and recirculating ball screw drives. For example, movement of table 32 in direction Z along the length of the base is imparted by drive motor 60 which is operatively connected to threaded ball screw 66 through reduction gears 64. In accordance with conventional practices, ball screw 66 is threadably engaged with a ball nut (not shown) which is captured in table 32. Threaded ball screw 66 is secured axially to base 10 and its rotation is transformed by the ball nut into a rectilinear movement of table 32.

Similarly, rectilinear movement of carriage 18 in direction X is imparted by drive motor 44 acting through reduction gearing 48 and ball screw 50. Tool head 22 is moved in direction Y by drive motor 52, reduction gearing (not shown) and ball screw 58. Arcuate motion of work head 8 is imparted by drive motor 68 acting through friction wheel 72 which contacts outer surface 74 of slide 34 which partly encircles pivot 36 at a fixed radial distance. The axis of friction wheel 72 is fixed to work head 38 and rotation of the friction wheel in contact with outer surface 74 of slide 34 advances one end of the work head around pivot 36. Drive motors 76 and 80 are also provided for rotating the tool and work gear, respectively.

Each of the respective drive motors is associated with either a linear or rotary encoder as part of a CNC system which governs the operation of the drive motors in accordance with instructions input to a computer. The encoders provide feedback information to the computer concerning the actual positions of each of the movable machine axes.

For example, in the embodiment illustrated, movement of carriage 18 on slides 16 is measured by linear encoder 46, movement of tool head 22 in slides 20 is measured by linear encoder 54, and movement of table 32 on slides 30 is measured by linear encoder 62. Arcuate movement of work head 38 about pivot 36 is measured by rotary encoder 70. Rotary encoders 78 and 82 are also provided for measuring the rotational positions of work spindle 40 and tool spindle 24, respectively. In accordance with conventional practices, it would also be possible to substitute rotary encoders for indirectly measuring the rectilinear movements by measuring the rotational positions of the associated drive motors or ball screws, or to substitute any other suitable means for measuring the respective positions of the movable axes.

Although the illustrated embodiment includes a particular arrangement of movable structures for relatively positioning the rotary tool and work gear, in principle, many other arrangements may be used to provide the same freedoms of adjustment. Accordingly, it would be possible to provide for moving either the work support or tool support relative to the other along any of the prescribed axes. For example, any of the rectilinear axes may be associated with movements of the tool support or work support, and either the tool support or work support may be pivoted with respect to the other.

However, in accordance with the present invention several important relationships must be met between tool axis T and work axis W for appropriately orienting the axes relative to each other. For example, it is important that the work axis W and tool axis T are relatively movable with respect to three rectilinear axes and one rotational (i.e., pivot) axis, and that the rotary tool and work gear are each rotatable about their respective axes. It is also important that either tool axis T or work axis W is positioned in a fixed angular orientation with respect to machine base 10 and that pivot axis P is associated with the arcuate movement of one or the other of tool axis T and work axis W. Further, it is important that both work axis W and tool axis T are inclined with respect to pivot axis P at fixed angles. The respective inclination angles are selected so that the sum and difference of these angles defines a predetermined range of angular orientations between the tool and work gear axes about the pivot axis for accommodating generating movements of a theoretical generating gear in mesh with a work gear.

Figure 4:
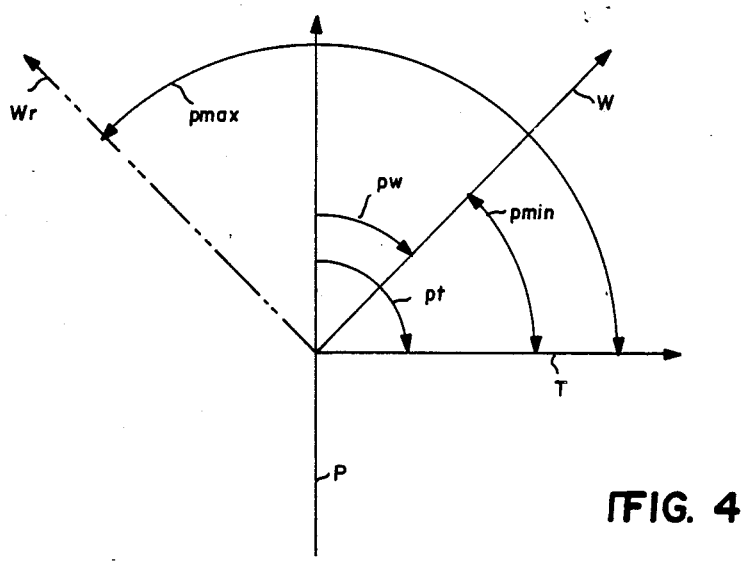
FIG. 4 is a geometric construction which illustrates the relationship between inclination angles of tool and work gear axes with respect to a pivot axis and a range of angular separations between the tool and work gear axes.

A range of possible angular orientations between tool axis T and work axis W associated with the relative position of pivot axis P is illustrated by way of example in FIG. 4. All three axes are depicted as directed line segments in the drawing plane of FIG. 4. Pivot axis P intersects tool axis T and work axis W forming included angles "pt" and "pw." These angles measure the respective inclinations of tool axis T and work axis W with respect to pivot axis P. The inclination angles are defined as the included angles formed at the intersections of the pivot axis with the tool and work axes in a common plane within which all three axes appear true length. The sense of direction of pivot axis P as a directed line segment is selected to minimize the sum of the included angles pt and pw. In the example depicted in FIG. 4, angle pw is equal to approximately 45 degrees and angle pt is a right angle (i.e., 90 degrees).

Both the maximum and minimum angular separations between two directed line segments are measured in positions at which the directed line segments appear in the same plane. Accordingly, both the initial and rotated positions of tool axis W about pivot axis P through 180 degrees are shown in the drawing plane. The rotated position of axis W, however, is shown in phantom line and designated as "$W_r$". The minimum angular separation between tool axis T and work axis W is measured by angle "pmin" and the maximum angular separation of rotated tool axis $W_r$ is measured by angle "pmax." It may now be observed that minimum angular separation pmin is equal to the difference between angles pt and pw, and maximum angular separation pmax is equal to the sum of angles pt and pw.

In the illustrated example, angle pmin is equal to 45 degrees and angle pmax is equal to 135 degrees. Thus, the range of angular separations which can be accommodated between the tool axis and work gear axis using a single pivot axis P oriented perpendicular to one axis and making an angle of 45 degrees with the other is between 45 and 135 degrees. It may also be noted that 180 degrees of relative rotation between the tool and work gear axes is required to achieve only a 90 degree range of angular separation.

However, by orienting pivot axis P perpendicular to both the tool and work gear axes in accordance with the preferred embodiment, a full range (i.e., 0 to 180 degrees) of angular separation between the tool and work gear axes is possible. In addition, each angular degree of relative rotation between the tool and work gear axes exactly corresponds to the same amount of angular separation between the axes. This minimizes the amount of angular machine travel required to achieve a particular angular separation between the axes.

Ordinarily, a range of angular separations between the tool and work axes of approximately 0 to 100 degrees is required to appropriately represent the working range of a conventional bevel and hypoid generating machine. Accordingly, if the pivot axis is positioned other than perpendicular to both the tool and work axes, it is preferred that the difference between the respective inclination angles approaches 0 degrees and the sum of the inclination angles approaches 100 degrees. A more general way of stating this is that the difference between the inclination angles of the tool and work gear axes with respect to the pivot axis should be less than either one of the respective inclination angles.

Figure 5:
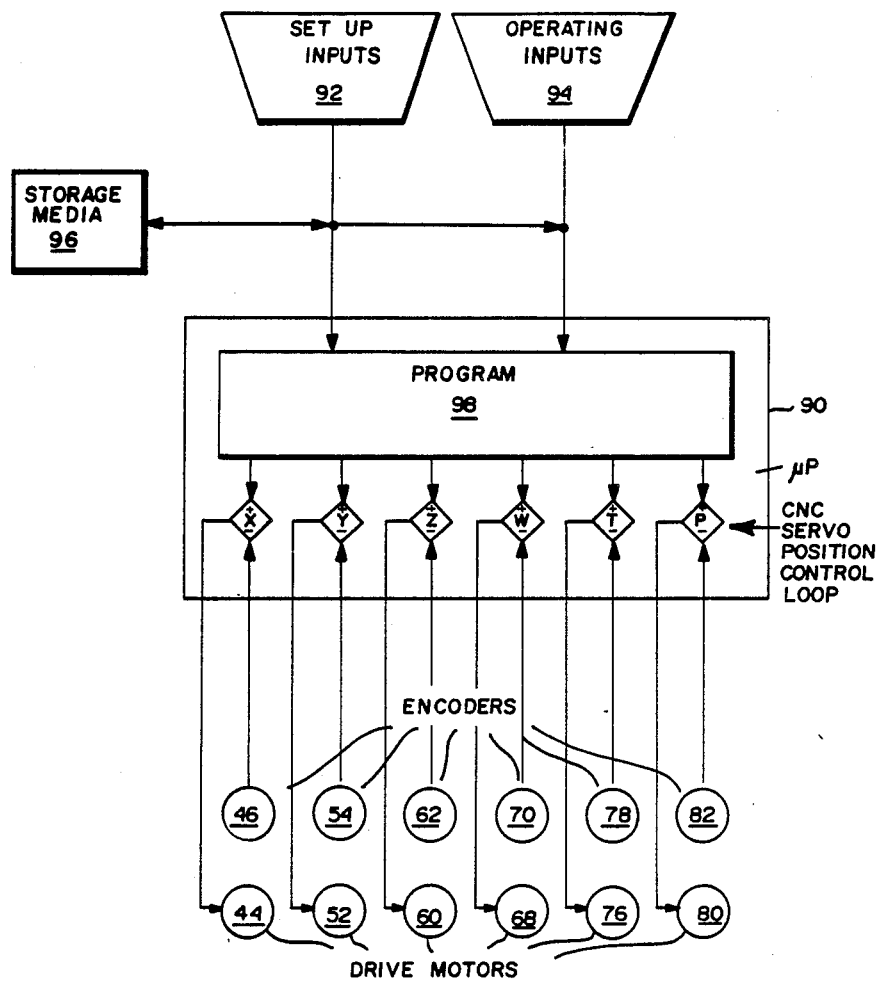
FIG. 5 is a schematic depiction of the computer numerical control system which is programmable to coordinate movements of the new machine axes.

A CNC system for governing the operation of the respective drive motors is schematically illustrated in FIG. 5. The system includes a microcontroller 90 which receives setup inputs 92 in the form of a series of constants which define a desired relationship between a particular work gear and a theoretical generating gear represented by the relative positions of the work gear and rotary tool. The microcontroller comprises the usual features of a microprocessor, input-output ports, memory and digital-to-analog converters. Additional operating inputs 94 to microcontroller 90 are provided for controlling movements of the tool and work gear during actual gear making operations (e.g., operating speeds, feed rates, start-stop positions, machine cycles, etc.). The setup and operating constants may, if desired, be representative of those used in a conventional gear making machine. Both inputs may be acquired interactively with an operator through a keyboard and CRT (not shown) or indirectly through storage medium 96 (e.g. RAM). The series of constants defining the setup and operation of the machine may be stored in advance of operation for a number of different jobs so that a variety of jobs may be performed sequentially without requiring further operator intervention in accordance with standard CNC practices.

Microcontroller 90 is controlled by a program 98 for receiving the input data and calculating the desired path of each of the controlled axes to appropriately represent the theoretical generating gear in mesh with the work gear. The calculated information concerning the desired next position of each of the machine axes X, Y, Z, P, T and W, is compared in a servo-position control loop with information regarding the actual positions of the respective axes obtained from encoders 46, 54, 62, 70, 78 and 82 and the differences between the actual and calculated positions of each movable axis are used to control respective drive motors 44, 52, 60, 68, 76 and 80 associated with each of the axes.

During intermittent indexing operations, the rate of change of axes X, Y, Z, P and W along their designated paths is determined in accordance with the desired rate of rotation the theoretical generating gear input at 94. The rotation of the rotary tool about axis T is independent of the movements of the other axes. However, during continuous indexing operations, one portion of the rotational rate of the work gear about axis W is determined by the amount of rotation desired for the theoretical generating gear and a second portion of its rotational rate is determined as a fixed proportion of the rotational rate of the rotary tool about axis T.

CNC systems for controlling movement of multiple machine axes along prescribed paths are now commonplace. Such state-of-the-art systems are incorporated in the present invention to control movements of selected axes along prescribed paths for forming tooth spaces in bevel and hypoid gears according to a rolling process in which the work gear is rolled in mesh with a theoretical generating gear having an axis of rotation which is allowed to vary with respect to the machine base.

The present invention in its preferred embodiment provides for receiving inputs 92, 94 in the form of constants which specify the setup and operating characteristics of a conventional generating machine (i.e., one which tilts the tool axis with respect to a rotatable cradle axis). Program 98 includes a series of instructions for defining an alternative coordinate system within which the positions of the tool and work gear axes specified for a conventional machine may be transformed and positively located by three coordinate measures and one angular measure about a predetermined pivot axis. The program also includes a series of instructions for performing a mathematical transformation of known positions of the tool and work gear axes with respect to a conventional generating machine into measures along three rectilinear axes and about one pivot axis in the new coordinate system. The known rotational positions of the tool and work gear about their respective axes in the conventional machine also forms a part of this transformation for specifying corresponding rotational positions of the tool and work gear in the new coordinate system. However, during intermittent indexing operations, the relative rotational position of the tool may be controlled independently of the other axes and may be eliminated from the transformation. The resulting measures along the three rectilinear axes and angular measures about the pivot axis, the work gear axis and, if necessary, the tool axis are used to control corresponding machine axes in the new machine.

Figure 6A:
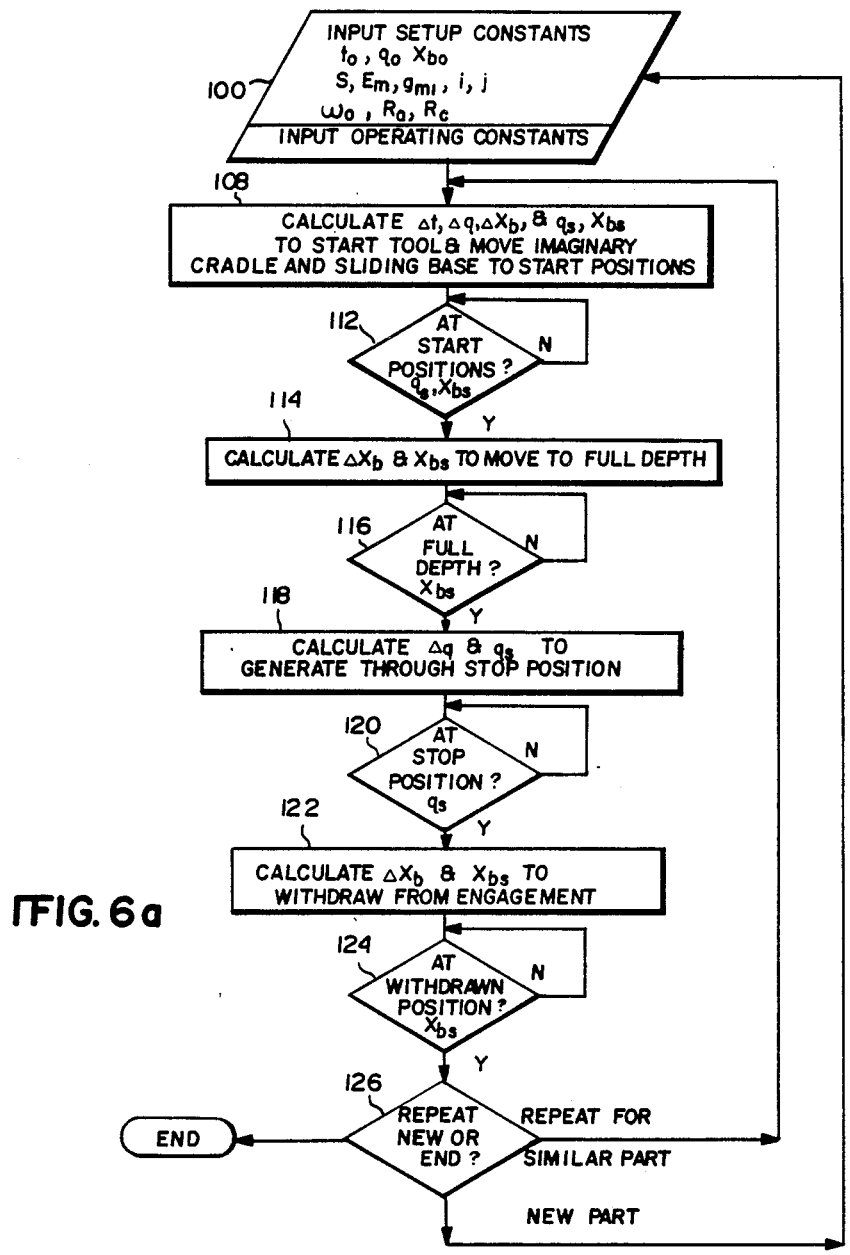
FIGS. 6a and 6b are schematic flow charts of a computer program for determining desired positions of the machine axes.
Figure 6B:
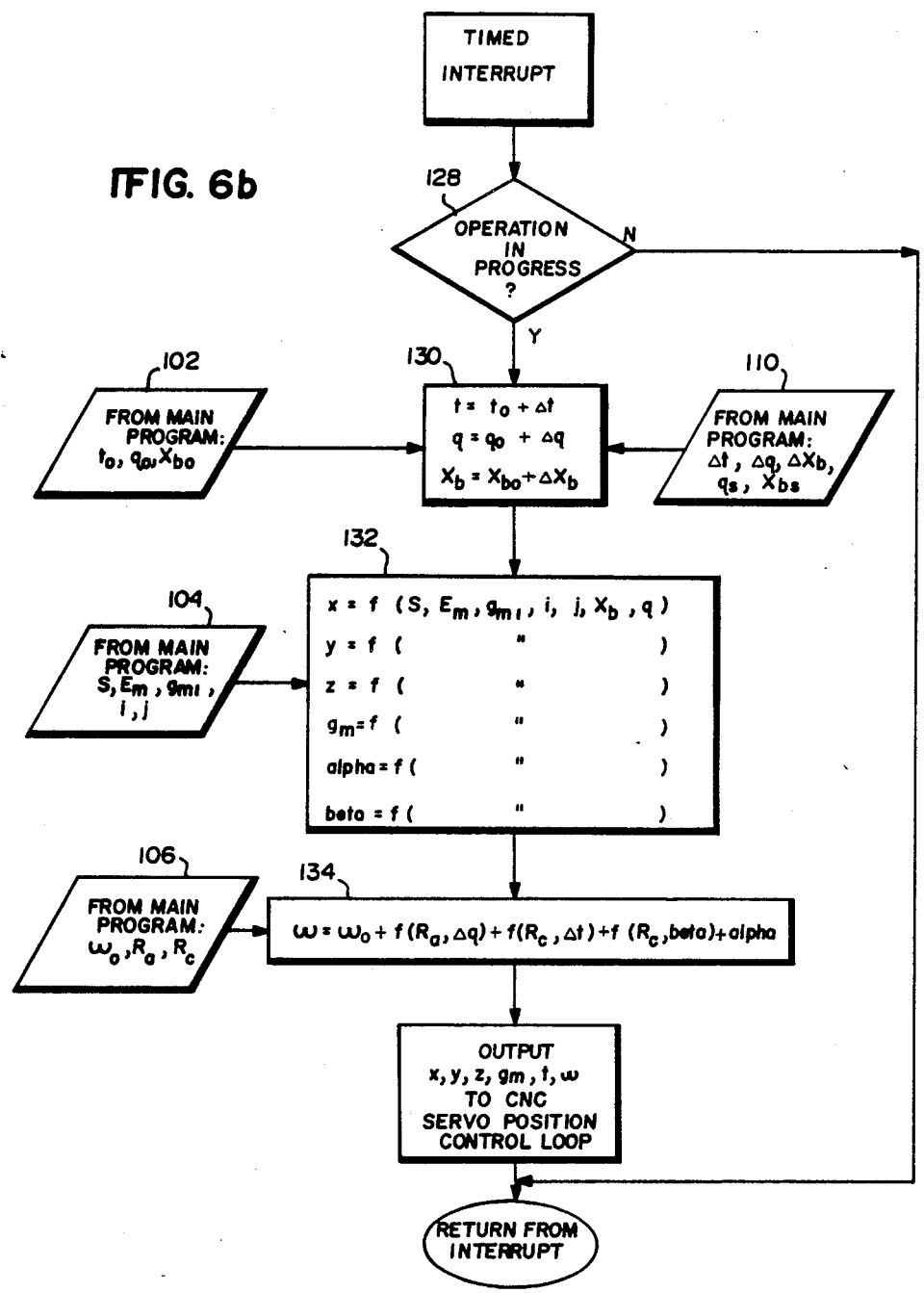

FIGS. 6a and 6b are schematic flow charts of a computer program which may be used to determine machine axes positions of the present invention in response to input parameters of a conventional bevel and hypoid generating machine. In particular, the flow chart depicts the general logic which is required to accomplish generating operations on the new machine with input information readily available for conventional generating machines.

The program includes two parts which are illustrated respectively in FIGS. 6a and 6b. FIG. 6a is a flow chart of a main program which controls machine operation, and FIG. 6b is a flow chart of a timed "interrupt" cycle which is executed in parallel with the main program at recurring intervals. The main program provides a series of instructions for controlling the movable axes of a conventional machine, and the interrupt cycle performs a series of calculations for determining the corresponding positions of the movable axes of the machine of the present invention and outputs these new positions to the CNC servo-position control loop of the new machine. The interrupt cycle temporarily halts execution of the main program at predetermined intervals and returns control to the main program upon completion of the series of calculations.

The main program of FIG. 6a receives two types of input at block 100. These are: (a) initial setup parameters of a conventional machine which include the positions of its various axes, the relative speed of cradle rotation with respect to work gear rotation for generation and the relative speed of tool rotation with respect to work gear rotation for continuous indexing, etc., and (b) operating parameters such as operating speeds, feed rates, start-stop positions, machine cycles, etc.

The initial setup parameters are passed to the interrupt cycle of FIG. 6b as input blocks 102, 104 and 106, respectively. The operating parameters, however, are retained in the main program. The first exemplary operation performed by the main program is designated at 108 in FIG. 6a. This operation provides for starting tool rotation and for moving an imaginary cradle and sliding base of a conventional machine to their respective start positions. Variables $\Delta t$, $\Delta q$ and $\Delta X_b$, which represent respective incremental changes in the tool and cradle rotational positions and sliding base rectilinear position, and variables $q_s$ and $X_{bs}$ which represent respective positions of the cradle and sliding base upon completion of the operation, are calculated by this operation. The interrupt cycle illustrated by FIG. 6b periodically monitors these variables at input block 110 and performs additional calculations using the updated values of these variables to determine corresponding positions of the movable axes of the new machine.

The calculated values of the variables $\Delta t$, $\Delta q$ and $\Delta X_b$ may represent desired incremental changes in the positions of the conventional machine axes over a given time interval between successive interrupt cycles. Thus, the rates of movement of the imaginary conventional machine axes may be controlled by the calculated magnitudes of these variables. The operation 108 relies on the operational parameters input at 100 to set the respective values of these variables for controlling such things as tool speed and the starting and stopping rates of the imaginary cradle and sliding base.

The calculated values of $q_s$ and $X_{bs}$ control the desired end positions of the cradle and sliding base associated with operation 108. The interrupt cycle also monitors the values of these variables to discontinue further movements of the cradle and sliding base once their desired positions have been reached. Operational parameters input at 100 may be used to specify particular values of variables $q_s$ and $X_{bs}$ for each operation.

A decision block 112 follows operation 108 and holds the main program at operation 108 until the axes of the new machine have reached their desired corresponding "start" positions specified by variables $q_s$ and $X_{bs}$. Typically, the start position of the imaginary cradle is at the center of generating roll and the sliding base is positioned out of engagement with the work gear.

The next step of the exemplary main program is to control the feed movement of the sliding base into full depth engagement between the rotary tool and work gear. This step, shown at block 114, requires the calculation of new values for variables $\Delta X_b$ and $X_{bs}$. The imaginary cradle is maintained at the center of the generating roll by holding variable $q_s$ equal to its calculated value of the previous operation, and the tool rotational speed is maintained by a constant value of variable $\Delta t$. Calculations performed by the interrupt cycle are updated by the contents of variable $\Delta X_b$ to obtain the next desired positions of the new machine axes representative of desired feed movements of the sliding base of a conventional machine until the full depth feed position represented by the current value of variable $X_{bs}$ has been reached.

Decision block 116, in a manner similar to decision block 112 discussed above, holds the operation of the main program at operation block 114 until the axes of the new machine have reached their desired positions corresponding to the sliding base position of a conventional machine specified by variable $X_{bs}$. A similar format of operation and decision blocks is assembled in the main program for each set of movements of the conventional machine axes required to complete the generation of tooth spaces in work gears.

For example, operation block 118 and decision 120 cooperate to control the movement of the imaginary cradle of the conventional machine to generate work gear tooth surfaces by envelopment. During this operation variable $X_{bs}$ may be maintained at the full depth engagement value calculated in the previous operation. Variable $\Delta q$ is controlled to produce the required rotation of the machine cradle to represent the rolling engagement of a theoretical generating gear in mesh with the work gear. The end position of cradle roll is specified by the calculated value of variable $q_s$.

Operation 122 and decision 124 provide for relatively withdrawing the tool from the work gear after completion of generating operation 120. Finally, decision 126 provides for ending the machine operation or returning to earlier portions of the main program to generate a similar work gear or one of a different specification. If a similar work gear is to be produced, it is not necessary to repeat the input of setup and operating constants at block 100.

The timed interrupt portion of the program, which operates in parallel with the main program, performs a series of calculations on a repetitive basis at a predetermined interval of time (e.g., fourteen milliseconds). Execution of the main program is temporarily halted by the interrupt cycle at the predetermined time intervals to perform a series of calculations and control is returned to the main program after completion of each cycle. Decision block 128, however, bypasses the calculation sequence of the interrupt cycle and returns control to the main program in the event that a machine operation is not in progress.

The first set of calculations performed within the interrupt cycle are shown in block 130. The operation combines information concerning the reference positions of the movable machine axes of the conventional machine from input block 102 with changes in the positions of these axes specified by the main program at input block 110 to produce values corresponding to the desired positions of the conventional machine axes. Input block 110 includes the current values of variables $\Delta t$, $\Delta q$, $\Delta X_b$, $q_s$ and $X_{bs}$ from the main program. Reference positions of the tool, cradle and sliding base from input block 102 are designated as $t_o$, $q_o$ and $X_{bo}$, respectively. These values are relied on only once in the interrupt cycle to initialize reference positions of the conventional machine axes and thereafter assume the last calculated values of machine axes positions. The results of calculations performed in operation block 130 are passed to transformation operation at 132 as variables $t$, $q$ and $X_b$ which represent the next desired positions of the movable conventional machine axes.

However, once the calculated positions of variables $q$ or $X_b$ reach equivalence with their associated end positions specified by variables $q_s$ and $X_{bs}$, the current contents of variables $\Delta q$ or $\Delta X_b$ are ignored (i.e., set equal to zero). This enables variables q and $X_b$ to be maintained at desired positions at the completion of each operation.

In addition to variables t, q and $X_b$ from operation 130, the transformation operation also receives input from block 102 in the form of a series of setup constants associated with the fixed setup axes of the conventional machine. These constants are designated as s, $E_m$, $g_{ml}$, i and j. Conventional machine settings represented by these setup constants are described in connection with FIGS. 7 through 9, infra. A mathematical transformation operation, which is also described in more detail below, is performed for each of the movable machine axes of the new machine as a function of the setup constants from block 104 and the next positions of the movable conventional axes from operation 130. The results of these operations are received by (a) variables x, y and z which specify corresponding positions of the respective rectilinear axes X, Y and Z of the new machine, (b) variable $g_m$ which specifies the corresponding angular position of the work gear axis relative to the tool axis about pivot axis P and (c) variables alpha and beta which specify phase angle adjustments to the rotational positions of work axis W and tool axis T associated with the transformation to the coordinate system of the new machine.

A subsequent operation 134 is performed to determine the desired rotational position of the work gear axis in accordance with phase angles alpha and beta and other setup constants from input block 106. The remaining setup constants supplied by block 106 include ratio of roll constant $R_a$ which specifies the ratio of relative rotation between the imaginary cradle and work gear required for generation, indexing constant $R_c$ which specifies the ratio of relative rotation between the tool and work gear for continuous indexing and reference constant $w_o$ which specifies a known rotational position between the tool and work gear. Other constants (not shown) may be used to further adjust the work gear axis rotational position for duplicating special motions of conventional machines such as "modified roll."

Although phase angle beta refers to an adjustment to the rotational position of the tool axis, it may be desired to maintain the rotational speed of the tool constant. Phase angle adjustment beta may be applied to the rotational position of the work gear axis while maintaining the same relative positions between the tool and work gear axes by additionally rotating the work gear axis through angle beta multiplied by the inverse of the indexing constant $R_c$. Accordingly, the position of work gear axis W may be calculated from the reference position of the work gear axis $w_o$ combined with a function of the ratio of roll constant $R_a$ and the change in cradle position $\Delta q$, a function of the indexing constant $R_c$ and the change in tool rotational position $\Delta t$ a function of the indexing constant $R_c$ and phase angle beta, and the phase angle alpha.

The calculated values of x, y, z, $g_m$, t and w are then output to the servo-position control loop of the CNC system for controlling the respective axes X, Y, Z, P, T and W of the new machine. Program execution then returns to the main program until the next interrupt.

In an alternative embodiment, the number of calculations required for controlling the operation of the new machine may be reduced by substituting operating constants for the Z axis of the new machine in place of operating constants for controlling movements of the sliding base of a conventional machine. That is, instead of calculating values of $\Delta X_b$ in the main program, values of $\Delta z$ in the direction of the Z axis of the new machine may be calculated to approximate rates of movement of the sliding base in a conventional machine. Variable $X_b$, therefore, remains equal to reference constant $X_{bo}$ and the only variable in the transformation function which is subject to change is q.

Since each of the output variables of the transformation operation 132 change only in response to changing values of variable q, lookup tables which list precalculated values for the output variables over an expected range of values for variable q may be substituted for the mathematical transformations performed by this operation. The table of precalculated values may be reduced in size while retaining desired accuracy by applying well known interpolation techniques for values of q which do not exactly match listed values of q in the table.

The variable $\Delta z$ may then be used to modify the value of z listed in the table to appropriately position the Z axis of the new machine. The listed values of the other output variables of operation 132 (x, y, $g_m$, alpha and beta) are treated in the remaining portion of the interrupt cycle in the same manner as if they were calculated in "real time." However, the use of a lookup table as a replacement for lengthy calculation procedures shortens the required time interval of the interrupt cycle and may contribute to improved accuracy and speed of machine operation.

In the context of the present invention the term "machine determining" refers to the operations of computer input and calculation required for arriving at desired positions of the movable machine axes. Thus, the operation of the new machine for generating purposes may be summarized by the steps of: (a) machine determining initial setup positions of movable machine axes of the new machine based on setup parameters of differently configured axes of a conventional bevel and hypoid generating machine, (b) moving the axes of the new machine to the initial setup positions, (c) machine determining further operating positions of the axes of the new machine based on operating parameters which relate to relative movements of the differently configured axes of the conventional machine, (d) moving the axes of the new machine to the further operating positions and (e) repeating steps "(c)" and "(d)" for completing the generating operation.

It may be appreciated that conventional machine inputs to the new machine of the present invention permit the use of vast amounts of know-how for developing desired tooth geometry which has been accumulated in terms of the setup and operation of conventional machines. In addition, this know-how may be more broadly applied in the machine of the present invention which obviates many of the physical limitations, such as limited ranges of tool tilt, which characterize particular conventional machines. Further, all of the known special motions of particular generating machines, such as "helical motion" and "modified roll" may be readily accommodated in the present invention by defining the known positions on the conventional machine and performing the required transformation into the coordinate system of the new machine.

Figure 8:
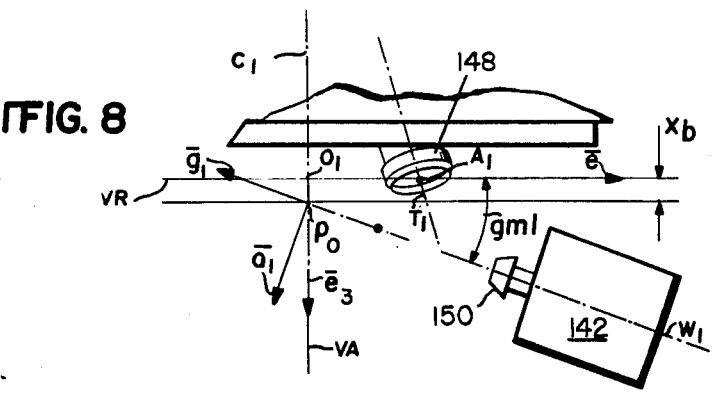
FIG. 8 is a plan view of the same known machine including additional setup relationships required to establish the relative positions of the tool and work gear.
Figure 7:
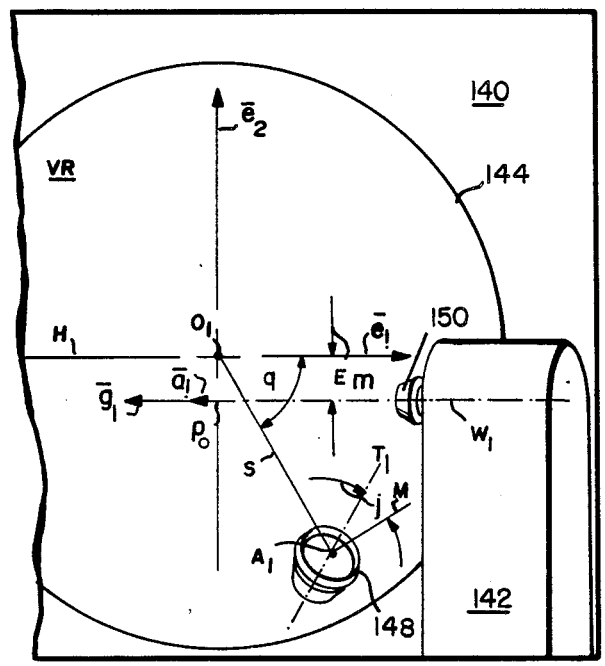
FIG. 7 is a schematic front view of a conventional gear generating machine with important setup relationships of the known machine superimposed on the machine outline.
Figure 9:
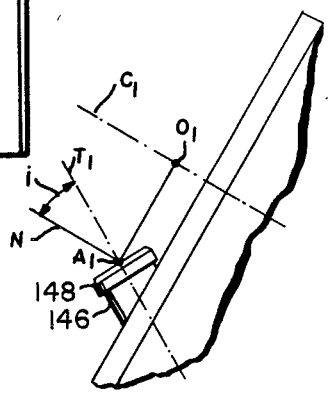
FIG. 9 is a partial view of FIG. 7 showing an inclined axis of the tool in true length.

FIGS. 7 through 9 depict known geometric relationships which describe setup parameters for positioning a tool and work gear on a conventional bevel and hypoid gear generating machine. In each figure, the geometric relationships are superimposed on a partial outline of the conventional machine.

The outline depicts tool support 140 and work support 142. Cradle 144 is mounted in tool support 140 for rotation about cradle axis "$C_1$" which is also the axis of an imaginary generating gear defined by the machine setup. Tilt mechanism 146 and rotary tool 148 are carried by cradle 144. Rotary tool 148 is journaled in tilt mechanism 146 for rotation about tool axis "$T_1$." Work gear 150 is journaled in work support 142 for rotation about work gear axis "$W_1$."

It may be observed from the figures under discussion that tool 148 has been reduced in size with respect to the typical proportions of a conventional machine and has been rotated about cradle axis $C_1$ out of operative engagement with work gear 150 to permit a clear illustration of the geometric relationships involved in the setup of the conventional machine. During operation, tool 148 is positioned in operative engagement with work gear 150 and is rotated about cradle axis $C_1$ in a timed relationship (e.g., ratio $R_a$, supra) with the rotation of work gear 150 about its axis $W_1$. In this way, a relative rolling, motion is imparted between tool 148 and work gear 150 as though the work gear were in mesh with a theoretical generating gear having an axis of rotation coincident with cradle axis $C_1$. Continuous indexing operations also require a timed rotation (e.g., ratio $R_c$, supra) of tool 148 and work gear 150 about their respective axes. The timed rotations of work gear 150 due to generation and continuous indexing are superimposed on one another to control resulting work gear rotation.

Tool axis $T_1$ includes, a point "$A_1$" along its length at the end face of tool 148. Point $A_1$ is considered the tool center and is understood to lie in a vertical plane "VR" which extends perpendicular to cradle axis $C_1$ at point "$O_1$" along the cradle axis. Plane VR is referred to as the "plane of cradle rotation". Point $A_1$ is located in this plane by length "s" of line segment $O_1$-$A_1$ and polar angle "q" measured from horizontal plane "H" which extends parallel to work gear axis $W_1$ and includes cradle axis $C_1$.

Work gear axis $W_1$ is positioned at a distance "$E_m$" from horizontal plane H. This distance is generally referred to as "work offset". In addition, work gear axis $W_1$ is inclined to the plane of cradle rotation VR by angle "$g_{ml}$". A point "$P_o$" along work gear axis $W_1$ is defined by the intersection of work gear axis $W_1$ with vertical plane "VA" which includes cradle axis $C_1$ and extends perpendicular to horizontal plane H and the plane of cradle rotation VR. Point $P_o$ is offset from the plane of cradle rotation by the distance "$X_b$". This parameter varies with the depth of tool penetration into the work gear.

The desired orientation of tooth surfaces on the theoretical generating gear is achieved by inclining tool axis $T_1$ with respect to line "N" which extends perpendicular to the plane of cradle rotation at point $A_1$. Angle "i" is shown true length in the elevational view of FIG. 9. The angular orientation of the inclined tool axis in the plane of cradle rotation (FIG. 7) is given by angle "j" which is measured with respect to a line "M" extending perpendicular to line segment $O_1$-$A_1$ in plane VR. Angles i and j are referred to as the angles of "tilt" and "swivel", respectively.

During operation of the conventional machine, inclined tool axis $T_1$ is rotated about cradle axis $C_1$ through a changing angle q in a timed relationship with the rotation of work gear 150. The change in angle q has the effect of changing the angular orientation of tool axis $T_1$ with respect to the fixed reference planes VA and H of the conventional machine. This enables the tool to represent the inclined tooth surfaces of a theoretical generating gear being rotated about a fixed axis coincident with cradle axis $C_1$.

For purposes of further identification of the initial setup requirements of a conventional machine, a Cartesian coordinate system defined by three mutually orthogonal unit vectors "$e_1$", "$e_2$" and "$e_3$" is oriented coincident with reference planes VR, VA and H. Unit vectors $e_1$ and $e_2$ appear in the respective traces of horizontal plane H and vertical plane VA through vertical plane VR. Unit vector $e_3$ appears in the trace of vertical plane VA through horizontal plane H.

Work gear axis $W_1$ has been extended to include unit vector "$g_1$" along its length. Unit vector $g_1$ may be defined by the following relationship:

$$g_1 = -\cos g_m e_1 - \sin g_m e_3.$$

Unit vector "$a_1$" is added to identify the rotational position of work gear 150 about axis $W_1$ and is defined by the following vector cross product:

$$a_1 = e_2 \times g_1$$

Unit vectors $g_1$ and $a_1$ identify the orientation of work gear 130 on the conventional machine and are shown true length in FIG. 8.

The views of FIGS. 10, 11, and 12 correspond to the views of FIGS. 7, 8 and 9. However, the outline of the conventional machine has been removed for improved clarity of the constructions and additional reference lines have been added which will now be discussed.

Vector $r_1$ extends from tool center $A_1$ to point $P_o$ on work axis $W_1$ and thereby locates point $P_o$ with respect to tool center $A_1$. In terms of the previously discussed settings of the conventional machine, vector $r_1$ is defined as follows:

$$r_1 = (-s \cos q)e_1 + (s \sin q - E_m)e_2 + X_b e_3.$$

Although in the example under consideration pivot point $P_o$ lies in the trace of plane VA in FIG. 8, it is contemplated that other positions of the pivot point along the gear axis may be used to minimize machine motions for a particular range of work gears. For example, the pivot point $P_o$ may be moved through the distance $P_g$ (not shown) along the gear axis from the intersection on the gear axis with plane VA. In that case the right side of above equation must be modified by subtracting the term $P_g g_1$ to redirect vector $r_1$ to the new pivot axis location.

One example of the desired machine configuration in the present invention in accordance with the illustrated embodiment provides for positioning tool axis $T_1$ perpendicular to the plane of cradle rotation VR. This may be accomplished while preserving the relative orientation of the tool and work gear with respect to the conventional machine by rotating both the tool and work gear axes about a line which extends perpendicular to the trace of tool axis $T_1$ in plane VR (i.e., the plane of FIG. 10).

Accordingly, unit vector "v" has been added in plane VR along a perpendicular to the trace of tool axis $T_1$. Unit vector v is expressed mathematically as follows:

$$v = \cos(q-j)e_1 - \sin(q-j)e_2.$$

Tool axis $T_1$ is aligned parallel with cradle axis $C_1$ by rotating both the tool and work gear axes about vector v by an angular amount equal in magnitude but opposite in direction to angle of tilt i. However, since an amount of rotation has been selected to reorient the tool axis to a desired angular orientation (i.e., perpendicular to plane VR), it is only necessary to rotate reference vectors $g_1$, $a_1$ and $r_1$. The rotated positions of these reference vectors are given, respectively, by vectors "g", "a" and "r" according to the following relationships:

$$g = (1-\cos i)(g_1 \cdot v)v + \cos i\, g_1 + \sin i(v \times g_1)$$

$$a = (1-\cos i)(a_1 \cdot v)v + \cos i\, a_1 + \sin i(v \times a_1)$$

$$r = (1-\cos i)(r_1 \cdot v)v + \cos i\, r_1 + \sin i(v \times r_1).$$

Figure 17:
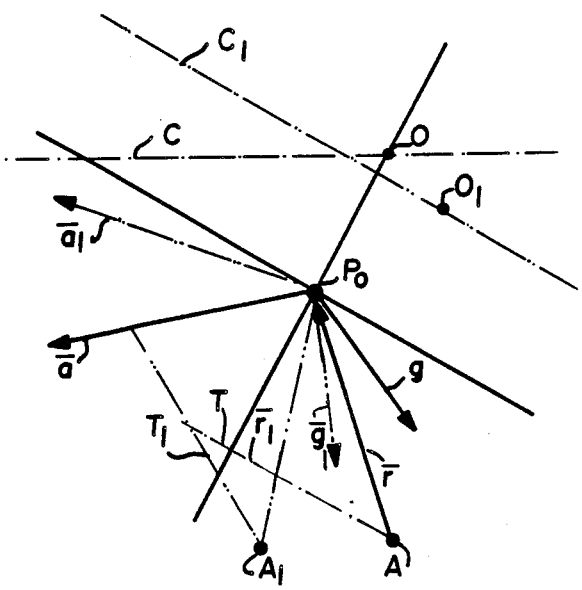
FIG. 17 is an enlarged view of FIG. 14.

The views of FIGS. 13 and 14 correspond respectively to the views of FIGS. 10 and 12. However, because of the number of important lines which must be shown in the relatively small view of FIG. 14, this same view has been greatly expanded in FIG. 17. The new rotated locations of the tool and work axes are respectively designated at T and W in contrast to their subscripted designations ($T_1$ and $W_1$) at their initial positions. Similarly, reference vectors g, a and r are shown in their new positions in contrast to their initial positions designated by corresponding subscripted characters ($g_1$, $a_1$ and $r_1$). Vector r now extends from the new position of the tool center at point "A" to point $P_o$. Although not part of the just described rotation, the new position of the cradle axis (as if it were to be rotated) is designated at "C" in FIG. 17. This corresponds to the rotated position of the theoretical generating gear axis.

The plane of FIG. 13 may now be considered as the front plane of the new gear making machine of the present invention. Thus, tool axis T is now perpendicular to the front plane of the new machine. However, it is also desired that work axis W lie entirely in a horizontal plane of the new machine. This is readily accomplished by defining the trace of a new horizontal plane to coincide with a new orientation of the work axis reference vector g projected into the plane of FIG. 13.

A new orthogonal coordinate system is now attached to the front plane of the new machine. The origin of the new orthogonal coordinate system including axes X, Y and Z is centered at point $P_o$ and the X axis of the new coordinate system is aligned with the projection of vector g in the plane of FIG. 13. The Y axis of the new system also lies in the plane of FIG. 13 (i.e. the front plane of the new machine) located 90 degrees counterclockwise of the X axis.

FIG. 15 shows the new horizontal plane of a machine configured in accordance with the present invention whose trace appears as the X axis in FIG. 13. Work axis W lies entirely in the plane of FIG. 15 and makes an angle $g_m$ with the front plane of the new machine. The third orthogonal axis Z of the new coordinate system is defined in the plane of FIG. 15 located 90 degrees clockwise of the X axis.

For purposes of further calculations, unit vectors $u_x$, $u_y$ and $u_z$ are respectively attached to the new orthogonal coordinate axes. The orthogonal unit vectors may be mathematically defined as follows:

$$u_z = e_3$$

$$u_y = (g \times u_z)/|g \times u_z|$$

$$u_x = u_y \times u_z.$$

The location of tool center A in the new coordinate system is identified by measures x, y and z along the respective coordinate axes as given by the following relationships:

$$x = -r \cdot u_x$$

$$y = r \cdot u_y$$

$$z = r \cdot u_z.$$

Point $P_o$, the origin of the new coordinate system, may also be considered as the point in the new machine about which work axis W may be pivoted in the new horizontal plane. Pivot axis P extends through point $P_o$ along the Y coordinate axis. Thus, in the horizontal plane of FIG. 15 in which both tool axis T and work axis W appear true length, pivot axis P extends perpendicular to both axes and the plane of their view. The angular separation between the tool and work gear axes "$g_m$" shown in FIG. 15 may be calculated as follows:

$$\sin g_m = -g \cdot u_z.$$

The relative positions of tool axis T and work gear axis W may now be completely defined by four component measures, namely, x, y, z and $g_m$. The movable machine axes of the new machine provide for independently adjusting the relative positions of the tool axis and work gear axis along each of these component directions. It may now be appreciated that the orthogonal coordinate system defined in FIGS. 13 through 16 exactly corresponds to directions X, Y and Z illustrated in FIG. 3 for defining the direction of movement of the various machine axes in the present invention. Pivot axis P, work axis W and tool axis T in the layout of FIGS. 13 through 16 also correspond to the same named axes defined for the present invention in the earlier figure.

In addition to controlling the relative positions of tool axis T and work gear axis W, it is also important to control the rotational position of the work gear about its axis W. FIGS. 8, and 11 illustrate rotational reference vector $a_1$ in its initial position in the horizontal plane of the conventional generating machine. Rotation of work gear axis $W_1$ about vector v moves vector $a_1$ out of horizontal plane H of the conventional machine to position a. FIG. 16 is a view looking down work gear axis W showing the rotated position of vector a with respect to the horizontal plane X-Z of the new machine. The amount of inclination of the key way line segment is given by angle "alpha." This angle represents a phase shift of the work gear angular position with respect to the initial angular position of the work gear in the conventional machine. Angle alpha may be defined as:

$$\sin \text{alpha} = -a_1 \cdot u_y.$$

A similar phase adjustment angle "beta" is required to obtain the new angular position of the tool when a continuous indexing method is used. The continuous method superimposes a timed relationship between the tool and work gear rotation in addition to the conventional generating motions of the machine. Angle beta is given by:

$$\sin \beta = -v \cdot u_y.$$

Ordinarily, however, it is desirable to maintain the rotational speed of the tool constant and the phase adjustment angle beta is transferred to the rotation of the work gear. This may be done by subtracting a proportional amount of this adjustment in the same predetermined ratio of tool and work gear rotation required for continuous indexing.

Thus, the relative positions of tool 148 and work gear 150 defined for the conventional generating machine by parameters s, q, $E_m$, $g_{m1}$, $X_b$, i and j may now be defined in a new generating machine by three rectilinear parameters x, y and z, and three rotational parameters $g_m$, alpha and beta. In the process of generation using the conventional machine shown in FIGS. 7 through 9, cradle 144 and work gear 150 perform coordinated rotations about their respective axes. This is known as a relative rolling motion as though a theoretical generating gear were in mesh with the work gear The setup parameter of a conventional machine which controls this function is referenced as $R_a$ in FIGS. 6a and 6b. Each position of cradle roll corresponds to a different polar angle q and a different work gear rotational position. Continuous indexing operations superimpose on this relationship a timed relationship (referenced as $R_c$ in FIGS. 6a and 6b) between the rotation of the tool and work gear.

The above described transformation to components x, y, z, $g_m$, alpha and beta of the present invention is performed for each roll position of the cradle and the associated rotational positions of the tool and work gear on the conventional machine. New component values of x, y, z and $g_m$, specify the exact positions of the tool and work gear axes on the new machine required to represent the same relative positions of these axes on a conventional machine. Phase angles alpha and beta modify the known rotational positions of the tool and work gear associated with generation and continuous indexing on a conventional machine to compensate for changes in their relative positions which accompany the transformation to a new coordinate system. Accordingly, it may now be appreciated that the generating roll of a conventional generating machine may be exactly represented by components x, y, z, $g_m$, alpha and beta in accordance with the above derivation.

It may be further noted that at each instant of the generating roll through angle q, tool axis T, in the above example, remains in a fixed angular orientation while work axis W varies in angular orientation within a horizontal plane X-Z which is parallel to tool axis T. This feature permits both the minimum and the maximum angular separation between the tool and work gear axes while requiring the least amount of relative angular motion to change their relative angular separations.

Although the above mathematical relations have been disclosed in terms of vector operations, the longstanding format of choice of gear theoreticians, the same relations may be readily expanded into equivalent trigonometric expressions or collected into a single matrix transformation. For example, an appropriate transformation matrix may be defined by arranging the direction cosines of coordinate unit vectors (e.g., $u_x$, $u_y$ and $u_z$) the new machine with respect to coordinate vectors (e.g., $e_1$, $e_2$ and $e_3$) of the conventional machine in matrix format. Reference vectors of the tool and work gear on the conventional machine (e.g., $g_1$, $a_1$ and $r_1$) may then be transformed into new reference vectors (e.g., g, a and r) in the coordinate system of the new machine by multiplication with the predefined matrix.

However the transformation is accomplished, it is important that the pivot axis and either the tool or work gear axis are defined in fixed angular orientations within a coordinate system attached to the new machine. Preferably, the three rectilinear movable axes of the new machine provide for relative movement between the tool and work gear in directions which correspond to the coordinate axes of the attached coordinate system. It is also important that the pivot axis is oriented with respect to both the tool and work gear axes to accommodate a range of angular separations between the tool and work gear axes. This range is defined by the sum and difference between the respective inclination angles made between the pivot axis and tool and work gear axes. Preferably, the pivot axis is aligned with one of the coordinate axes of the attached coordinate system and forms right angles with both the tool axis and work gear axis.

Figure 18:
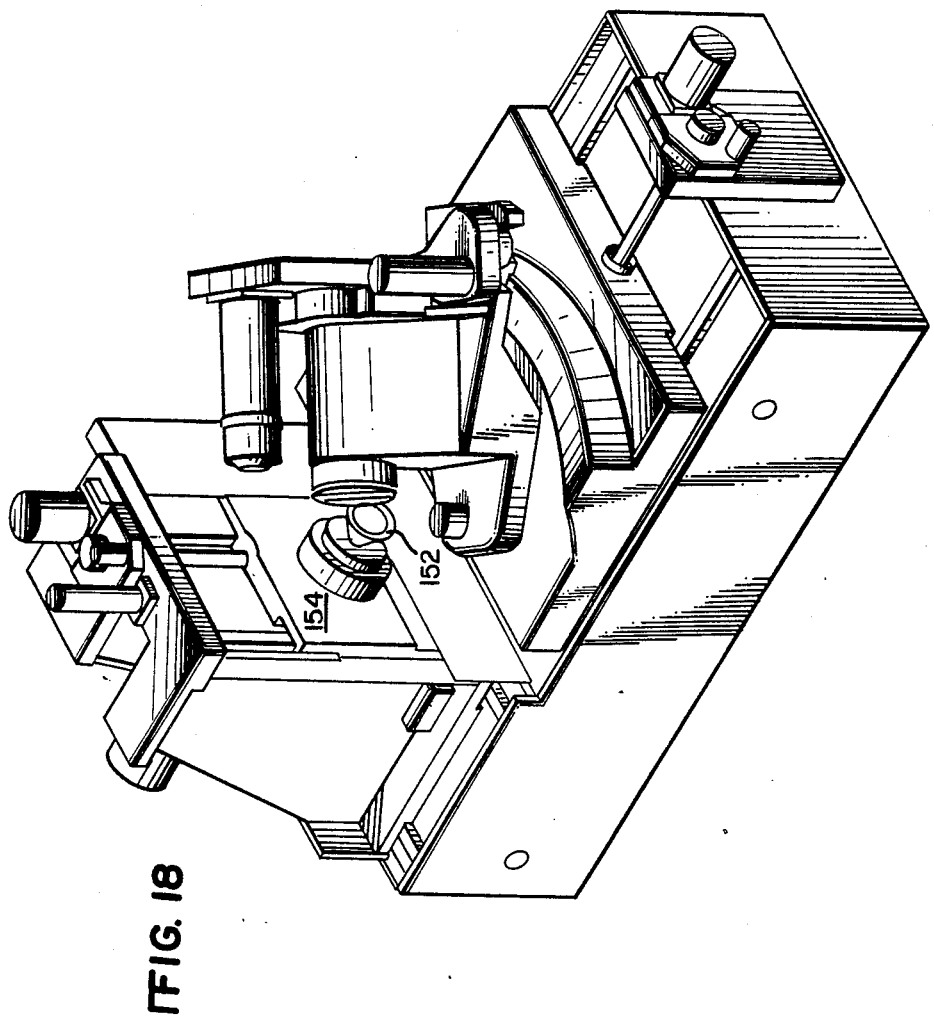
FIG. 18 is a perspective view of the new machine arranged with a flared cup wheel in engagement with a work gear.

An alternative embodiment is illustrated by FIG. 18 in which flared cup grinding wheel 152 is mounted on tool head 154. Otherwise, the illustrated machine is identical to the machine of FIGS. 1 and 2. Typically, flared cup grinding wheels are used on conventional bevel and hypoid generating machines in non-generating operations. Instead of using the conventional machine cradle to effect the relative rolling motion of generation, the machine cradle is used to impart an oscillatory motion which rocks the flared cup wheel back and forth along tooth length. This approach is used primarily to improve contact conditions in the grinding area of non-generated gears.

The same transformation from the coordinate system of a conventional machine to the machine of the present invention may be performed for each increment of cradle rotation. Although work gear rotation is no longer associated with cradle rotation, phase angle alpha, described above, must be used to adjust the rotational position of the work gear to compensate for changes in its relative rotational position with respect to the tool axis accompanying the transformation.

It is also contemplated that the bevel and hypoid generating machine of the present invention may be used to produce longitudinally curved tooth parallel axis gears. A method of producing such gears according to a continuous indexing operation on a conventional bevel and hypoid generating machine is described in U.S. Pat. No. 4,211,511. Once again, the same transformation of movable axes may be performed in accordance with the present invention so that conventional machine inputs may be used to control a much simplified arrangement of machine axes.

Although only a limited number of exemplary embodiments of the present invention have been described above, it will be appreciated by those familiar with the art that many other embodiments are readily apparent in accordance with the teachings of the present invention.

What is claimed is:

1. In a machine for generating longitudinally curved tooth spaces in bevel and hypoid gears using a tool having stock removing surfaces, the machine of the type having:

a machine base;
a tool support mounted on said base;
means for rotating said tool in said tool support about a tool axis (T);
a work support mounted on said base;
means for rotating a work gear in said work support about a work axis (W);
means for imparting relative movement between said tool support and said work support along three rectilinear axes (X, Y, and Z);
means for imparting relative angular movement between said tool support and said work support about no more than one pivot axis (P); and,
means for substantially simultaneously controlling said rotation of the work gear together with said relative rectilinear movement between the tool and work supports for generating said longitudinal tooth spaces in said work gear; the improvement wherein:
said controlling means includes means for also substantially simultaneously controlling said relative angular movement between the tool and work supports, whereby a separate tool axis tilt mechanism on the machine is not needed to accomplish the results customarily achieved thereby.

2. The machine of claim 1, the further improvement wherein said controlling means provides for imparting relative angular motion between said tool axis and said work axis about a theoretical axis of rotation defined by said motion between the tool and work axes that assumes one or more positions inclined with respect to said tool axis, said work axis and said pivot axis.

3. The machine of claim 2, the further improvement wherein said controlling means also provides for further imparting a predetermined relative rolling motion between said tool and said work gear as though said work gear were in mesh with a theoretical generating gear rotating about said theoretical axis of rotation and having tooth surfaces represented by said stock removing surfaces of the tool.

4. The machine of claim 3, the further improvement wherein said theoretical generating gear axis varies in angular orientation with respect to said machine base in the course of said predetermined relative rolling motion between the tool and work gear.

5. The machine of claim 4, the further improvement wherein said controlling means also provides for adjusting said rotation of the work gear as a function of said varying angular orientation of the theoretical generating gear axis with respect to the machine base so as to maintain said predetermined rolling motion between the tool and work gear.

6. The machine of claim 5 wherein said controlling means also includes means for substantially simultaneously controlling relative rotations between said work gear and said tool about their respective axes in a predetermined timed relationship with each other.

7. The machine of claim 6, the further improvement wherein said controlling means also provides for adjusting one of said rotation of the tool and said rotation of the work gear as a function of said varying angular orientation of the theoretical generating gear axis with respect to the machine base so as to maintain said predetermined timed relationship between the tool and work gear in the course of said predetermined relative rolling motion between the tool and work gear.

8. The machine of claim 7, the further improvement wherein said controlling means also provides for further adjusting said rotation of the work gear as a function of said varying angular orientation of the theoretical generating gear axis with respect to the machine base so as to maintain said predetermined timed relationship between the tool and work gear in the course of said predetermined relative rolling motion between the tool and work gear.

9. The machine of claim 5, the further improvement wherein said theoretical generating gear axis remains at substantially constant angular inclinations with respect to both said work axis and said tool axis in the course of said relative rolling motion between the tool and work gear.

10. The machine of claim 7, the further improvement wherein one of said tool axis and said work axis remains in a fixed angular orientation with respect to said machine base and the other of said two axes varies in angular orientation with respect to said machine base; both said tool axis and said work axis remaining at constant angular inclinations to said pivot axis in the course of generating longitudinal tooth spaces in said work gear.

11. The machine of claim 10, the further improvement wherein the sum and difference of said constant inclination angles formed between the pivot axis and each of the tool and work axes define a range of angular separations between said tool axis and said work axis such that said difference between inclination angles is less than the magnitude of either of said inclination angles.

12. The machine of claim 11, the further improvement wherein said range of angular separations between the tool and work axes is at least 0 degrees to 100 degrees.

13. The machine of claim 1 wherein said tool support includes a carriage mounted on said base for movement along one of said rectilinear axes (X), a tool head carried by said carriage for movement along another of said rectilinear axes (Y), and a tool spindle journaled in said tool head for rotatively mounting said tool about said tool axis (T), and the further improvement wherein said controlling means provides for controlling movement of said carriage and said tool head so that a resulting path traced by said tool axis (T) in a plane defined by the respective rectilinear axes (X, Y) along which said carriage and said tool head are moved departs from a circle.

14. The machine of claim 13 wherein said work support includes a table mounted on said base for movement in yet another of said rectilinear directions (Z), a work head pivotally mounted on said table for angular movement about said pivot axis (P), and a work spindle journaled in said work head for rotatively mounting said work gear about said work axis (W); and the further improvement wherein said controlling means also provides for imparting a relative angular movement between said tool spindle and said work spindle about a theoretical axis of rotation (C) that is inclined with respect to said tool axis (T), said work axis (W) and said pivot axis (P).

15. The machine of claim 14 wherein said three rectilinear axes (X, Y, Z) are substantially mutually orthogonal and said pivot axis (P) extends in a direction substantially parallel to one of said three mutually orthogonal rectilinear axes (X, Y, Z) and substantially intersects said work axis (W) in the vicinity of the work gear.

16. The machine of claim 15 wherein said three mutually orthogonal rectilinear axes (X, Y, Z) define a coordinate system, and the further improvement wherein said controlling means also provides for varying the angular orientation of said theoretical axis of rotation (C) within said coordinate system.

17. The machine of claim 16, the further improvement wherein said theoretical axis of rotation (C) remains at substantially constant angular inclinations with respect to said work axis (W) and said tool axis (T).

18. The machine of claim 17 wherein said controlling means also includes means for substantially simultaneously controlling said rotation of the tool about tool axis (T) in a timed relationship with said rotation of the work gear about work axis (W).

19. In a computer numerically controlled machine for generating bevel and hypoid gears using a tool having stock removing surfaces projecting from a front face thereof for working both flanks of longitudinally curved tooth spaces in the gears, the machine of the type having:
 a support for mounting said tool for rotation about a tool axis;
 a support for mounting a work gear for rotation about a work axis;
 means for rotating said tool about its axis;
 means for rotating said work gear about its axis;
 means for relatively moving said work support and said tool support with respect to each other in three rectilinear directions;
 means for relatively pivoting said work support and said tool support with respect to each other about a pivot axis; and,
 a computer for substantially simultaneously controlling said rotation of the work gear together with said relative rectilinear movements between the tool and work gear for operatively engaging said tool with both flanks of said tooth spaces in the work gear and for imparting a predetermined relative rolling motion between said tool and said work gear as though the work gear were in mesh with a theoretical generating gear having an axis of rotation defined by said predetermined rolling motion and tooth flanks represented by said stock removing surfaces of the tool; the improvement wherein:
 said computer also provides for substantially simultaneously controlling said relative pivoting between the tool and work gear so as to relatively orient said tool axis inclined to said generating gear axis, whereby a range of generating gears can be defined by said predetermined rolling motion which would otherwise normally require a separate mechanical structure for this purpose.

20. The machine of claim 19, the further improvement wherein said generating gear axis varies in inclination with respect to said pivot axis in the course of generating both flanks of said tooth spaces in the work gear.

21. The machine of claim 20 wherein said generating gear axis remains at substantially constant angular inclinations with respect to said work axis and said tool axis in the course of generating both flanks of said tooth spaces in the work gear.

22. The machine of claim 21, the further improvement wherein said computer also provides for adjusting said rotation of the work gear as a function of said varying inclination of the generating gear axis with respect to the pivot axis so as to maintain said predetermined rolling motion between the tool and work gear.

23. The machine of claim 22 wherein said computer also provides for controlling relative rotations between said work gear and said tool about their respective axes in a predetermined timed relationship with each other, and the further improvement wherein said computer also provides for adjusting one of said rotation of the tool and said rotation of the work gear as a function of said varying inclination of the generating gear axis with respect to the pivot axis so as to maintain said predetermined timed relationship between the tool and work gear in the course of generating both flanks of said tooth spaces in the work gear.

24. The machine of claim 23, the further improvement wherein said computer also provides for further adjusting said rotation of the work gear to maintain said predetermined timed relationship.

25. The machine of claim 20 wherein no more than one pivot axis is provided for varying angular orientations of said tool and work axes with respect to each other.

26. The machine of claim 25 wherein both said tool and work axes remain at constant inclination angles with respect to said pivot axis in the course of generating both flanks of said tooth spaces in the work gear.

27. The machine of claim 26 the further improvement wherein the sum and difference of said constant inclination angles define a range of angular separations between said tool and work axes such that said difference between inclination angles is less than the magnitude of either of said inclination angles.

28. The machine of claim 27 wherein said pivot axis extends substantially perpendicular to both said tool axis and said work axis.

29. The machine of claim 28 wherein said three rectilinear directions are mutually orthogonal and said pivot axis is aligned with one of said directions.

30. In a computer numerically controlled machine for generating longitudinally curved tooth spaces in at least one member of a pair of bevel and hypoid gears using a tool having stock removing surfaces projecting from a front face thereof, the machine of a type having:
 a support for mounting said tool for rotation about a tool axis;
 a support for mounting one member of a mating work gear pair for rotation about a work axis;
 means for rotating said tool about said tool axis;
 means for rotating said one member about said work axis;
 means for relatively moving said work support and said tool support relative to each other in three rectilinear directions;
 means for relatively pivoting said work support and said tool support relative to each other about a pivot axis; and,
 a computer for substantially simultaneously controlling said rotation of the one member and said relative rectilinear movement between the work and tool supports for generating longitudinally curved tooth spaces in the one member; the improvement wherein:
 said computer provides for also substantially simultaneously controlling said relative pivoting between the work and tool supports so that said stock removing surfaces of the tool are oriented with respect to said one member so as to represent tooth surfaces of the other member of said work gear pair having an axis of rotation that is inclined to said tool axis.

31. The machine of claim 30, the further improvement wherein said computer also provides for controlling a predetermined relative rolling motion between said tool and said one member as though said one member were in mesh with the other member of said work gear pair.

32. The machine of claim 31, the further improvement wherein said axis of the other member varies in position about said work axis.

33. The machine of claim 32, the further improvement wherein said computer also provides for adjusting said rotation of the one member to compensate for said variations in position of the axis of the other member so as to maintain said predetermined relative rolling motion between the tool and the one member.

34. The machine of claim 33 the further improvement wherein said work axis varies in position about said tool axis.

35. The machine of claim 34 wherein said computer also provides for controlling relative rotations between said work gear and said one member about their respective axes in a predetermined timed relationship with each other, and the further improvement wherein said computer also provides for adjusting one of said rotation of the tool and said rotation of the one member to compensate for said variations in position of the work axis about the tool axis so as to maintain said predetermined timed relationship between rotations of the tool and work gear.

36. The machine of claim 35 the further improvement wherein said computer also provides for further adjusting said rotation of the work gear to maintain said predetermined timed relationship between rotations of the tool and work gear.

37. The machine of claim 33 the further improvement wherein said tool axis and said work axis remain at substantially constant inclination angles with respect to said pivot axis in the course of said relative rolling motion between the tool and work gear.

38. The machine of claim 37, the further improvement wherein the sum and difference of said constant inclination angles formed between the pivot axis and each of the tool and work axes define a range of angular separations between said tool axis and said work axis such that said difference between inclination angles is less than the magnitude of either of said inclination angles.

39. The machine of claim 38 wherein said pivot axis extends substantially perpendicular to both said tool axis and said work axis.

40. The machine of claim 39 wherein said three rectilinear directions are mutually orthogonal and said pivot axis is aligned with one of said directions.

41. In a machine for generating longitudinally curved tooth spaces in bevel and hypoid gears using a tool having stock removing surfaces, the machine of the type having:
a machine base;
a tool support mounted on said base;
a tool spindle journaled in said tool support for mounting said tool, said tool spindle being journaled in said tool support in a fixed angular orientation with respect to said machine base;
means for rotating said tool;
a work support pivotally mounted on said base;
a work spindle journaled in said work support for mounting a work gear;
means for rotating said work gear;
means for relatively moving said tool support and work support with respect to each other; and,
means for effecting a predetermined relative rolling motion between said tool and said work gear as though said work gear were in mesh with a theoretical generating gear having an axis of rotation defined by said relative rolling motion and tooth surfaces represented by said stock removing surfaces of the tool; the improvement wherein:
said rolling motion means provides for positioning said axis of rotation of the theoretical generating gear at one or more angular orientations which differ from the fixed angular orientation of said tool spindle, whereby conventional generating effects associated with an inclination of a tool spindle with respect to a theoretical generating gear axis are achieved with the tool spindle remaining in a fixed orientation.

42. The machine of claim 41, the further improvement wherein said generating gear axis varies in angular orientation with respect to said machine base in the course of said predetermined relative rolling motion between the tool and work gear.

43. The machine of claim 42 the further improvement wherein said rotation of the work gear is adjusted to maintain said predetermined relative rolling motion as a function of said variation in angular orientation of the generating gear axis.

44. The machine of claim 43, the further improvement wherein said rolling motion means includes means for pivoting said work support with respect to said tool support about a pivot axis, and said work spindle varies in angular orientation with respect to said tool spindle in the course of said predetermined relative rolling motion.

45. The machine of claim 44 wherein said work spindle and said tool spindle remain at substantially constant inclination angles with respect to said pivot axis in the course of said predetermined relative rolling motion.

46. The machine of claim 45 wherein said rolling motion means includes means for moving said tool spindle with respect to said work spindle in three rectilinear directions, one of said directions being along said tool spindle and another being along said pivot axis.

47. In a computer controlled machine for generating tooth spaces in bevel and hypoid gears using a tool having stock removing surfaces, the machine of the type having:
a support for mounting said tool for rotation about a tool axis;
a support for mounting a work gear for rotation about a work axis;
a drive motor for rotating said tool about said tool axis;
a drive motor for rotating said work gear about said work axis;
respective drive motors for relatively moving said work support and said tool support with respect to each other along three rectilinear axis; and,
a drive motor for relatively pivoting said work support and said tool support with respect to each other about a pivot axis; and,
encoders associated with each of said drive motors for providing feedback information concerning positions of the tool and work gear with respect to each of said axes; and,
a computer for moving each of said drive motors to predetermined setup positions and for substantially simultaneously controlling said work gear drive motor and said respective drive motors for imparting a predetermined relative rolling motion between said tool and said work gear as though the work gear were in mesh with a theoretical generating gear having an axis of rotation defined by said predetermined rolling motion and tooth flanks represented by said stock removing surfaces of the tool; the improvement wherein:
said computer includes means for determining incremental rotational positions of said theoretical generating gear and for performing calculations based on said incremental positions for controlling each of said drive motors involved with imparting said predetermined rolling motion.

48. The machine of claim 47, the further improvement wherein said computer provides for substantially simultaneously controlling said pivot drive motor together with said other substantially simultaneously controlled motors imparting a predetermined rolling motion defining a generating gear axis inclined to said tool axis.

49. The machine of claim 48, the further improvement wherein said calculations include transforming positions of said tool and said work gear in a first coordinate system attached to said generating gear axis into new positions in a second coordinate system attached to said machine.

50. The machine of claim 49, the further improvement wherein said new positions include a position of said work gear about its axis and relative positions of said work and tool supports along said three rectilinear axes and about said pivot axis.

51. The machine of claim 47, the further improvement wherein said computer also provides for controlling relative rotations between said work gear and said tool about their respective axes in a predetermined timed relationship with each other, and said work drive motor is controlled to compensate for variations in the relative position of said work axis about said tool axis so as to maintain said predetermined timed relationship.

52. In a machine for generating bevel and hypoid gears, using a tool having stock removing surfaces, including no more than six movable machine axes for setting initial positions of said tool and a work gear and for operatively engaging said tool with said work gear, the machine of a type having:
an axis for rotating said work gear;
an axis for rotating said tool;
three axes for translating said tool and said work gear with respect to each other;
no more than one axis for pivoting said tool and said work gear with respect to each other;
means for imparting a predetermined relative rolling motion between said tool and said work gear about a theoretical axis of rotation defined by said motion; the improvement wherein:
said motion means includes means for adjusting said rotation of the work gear to compensate for additional relative movements of said theoretical axis of rotation about said work axis so as to maintain said predetermined relative rolling motion.

53. The machine of claim 52 wherein said motion means also includes means for imparting relative rotations between said work gear and said tool about their respective axes in a predetermined timed relationship with each other, and the further improvement wherein said motion means also includes means for adjusting one of said rotation of the work gear and said rotation of the tool in response to additional relative movements of said work axis about said tool axis so as to maintain said predetermined timed relationship.

54. The machine of claim 53 wherein said theoretical axis of rotation is further defined by a relative rolling motion between said tool and said work gear as though the work gear were in mesh with a theoretical generating gear having as its axis of rotation said theoretical axis of rotation and tooth surfaces defined by said stock removing surfaces of the tool.

55. The machine of claim 53, the further improvement wherein said generating gear axis is inclined with respect to said tool axis.

56. In an apparatus for making bevel and hypoid gears having longitudinally curved tooth spaces in an enveloping process wherein tooth surfaces are defined in a work gear by the stock removing surfaces of a tool and relative motions of said tool with respect to said work gear, the apparatus of a type including:
means for rotating said tool about a tool axis;
means for rotating said work gear about a work axis;
means for translating said tool axis and said work axis with respect to each other in three directions;
means for pivoting said tool axis and work axis with respect to each other; and,
means for substantially simultaneously controlling said rotation of the work gear together with said translation between the tool and work axes for moving said stock removing surfaces in a path of engagement with said tooth surfaces of the work gear angularly with respect to a plane of action between them; the improvement wherein:
said controlling means provides for also substantially simultaneously controlling said pivoting between the tool and work axes thereby defining a theoretical axis of rotation between said tool axis and said work axis to which said tool axis is inclined and which varies in inclination with respect to said pivot axis, whereby said angularity of engagement between the tool and work gear may be further controlled.

57. The apparatus of claim 56 wherein said stock removing surfaces are inclined to said tool axis at a pressure angle greater than zero.

58. The apparatus of claim 57 the further improvement wherein said path of engagement between the tool and work gear is further defined by a predetermined relative rolling motion between said tool and said work gear as though said work gear were in mesh with a theoretical generating gear rotating about said theoretical axis of rotation and having tooth surfaces represented by said stock removing surfaces of said tool.

59. The apparatus of claim 58, the further improvement wherein said controlling means also provides for adjusting said rotation of the work gear as a function of said varying inclination of the generating gear axis with respect to the pivot axis so as to maintain said predetermined rolling motion between the tool and work gear.

60. The apparatus of claim 59 wherein said controlling means includes means for controlling relative rotations between said work gear and said tool about their respective axes in a timed relationship with each other, and the further improvement wherein said controlling means also includes means for adjusting one of said rotation of the tool and said rotation of the work gear as a function of said varying inclination of the generating gear axis with respect to the pivot axis so as to maintain said predetermined timed relationship between the tool and work gear in the course of said predetermined rolling motion between the tool and work gear.

61. The apparatus of claim 60 the further improvement wherein said controlling means also provides for further adjusting said rotation of the work gear as a function of said varying inclination of the generating gear axis so as to maintain said predetermined timed relationship between the tool and work gear.

62. The apparatus of claim 61 the further improvement wherein said generating gear axis remains at substantially constant angular inclinations with respect to both said work axis and said tool axis in the course of said relative rolling motion between the tool and work gear.

63. The apparatus of claim 57 wherein both said tool axis and said work axis remain at constant angular inclinations to said pivot axis along said path of engagement between the tool and work gear.

64. The apparatus of claim 63, the further improvement wherein the sum and difference of said constant inclination angles formed between the pivot axis and each of the tool and work axes define a range of angular separations between said tool axis and said work axis such that said difference between inclination angles is less than the magnitude of either of said inclination angles.

65. The apparatus of claim 64 wherein said pivot axis extends substantially perpendicular to both said tool axis and said work axis.

66. The apparatus of claim 65 wherein said three rectilinear directions are mutually orthogonal and said pivot axis is aligned with one of said directions and said tool axis is aligned with another of said directions.

67. Apparatus for making gears on a first gear-making machine having N moveable axes for positioning and relatively moving a tool member and a work gear member being formed characterized by:
means for generating signal values for M moveable axes representative of positions and relative movements between said members as is required for forming a predetermined gear using a second gear making machine having certain of said M axes arranged in the same configuration as certain of said N axes of said first machine, said M axes being a larger number of axes than said N axes;
means for transforming said signal values for said M axes into signal values for said N axes; said signal values for said certain of the M axes being different than said signal values for said certain of the N axes arranged in the same configuration; and
means for controlling said first gear-making machine in response to said signal values for said N axes to form said predetermined gear from said work gear member.

68. The apparatus of claim 67 wherein said means for generating signal values for said M axes includes means for generating such values to produce hypoid and bevel gears having longitudinally curved teeth.

69. The apparatus of claim 68 wherein one of said M axes is a rotatable cradle for imparting a relative rolling motion between said tool member and said work gear member.

70. The apparatus of claim 69 wherein at least one of said M axes is arranged for inclining a tool axis relative to a cradle axis.

71. The apparatus of claim 70 wherein said N axes equal six movable machine axes and said M axes equal at least nine movable axes.

72. In an apparatus for generating longitudinally curved tooth gears according to a continuous indexing process using a tool having stock removing surfaces, the apparatus of a type having:
a base;
a tool support mounted to said base and defining a tool axis about which a tool is rotatable, said tool axis having a fixed angular orientation with respect to said base;
a work gear support mounted to said base defining a work axis about which a work gear is rotatable;
no more than one pivot axis inclined at a predetermined inclination with respect to both said tool axis and said work axis and about which said work axis is pivotally mounted with respect to said base;
means for rotating said tool;
means for rotating said work gear;
rectilinear motion means for producing three-dimensional rectilinear relative motion between said tool and work supports; and,
motion control means for substantially simultaneously controlling said rotation of the work gear together with said rectilinear motion between the tool and work supports for imparting a predetermined relative rolling motion between the tool and work gear about a theoretical axis of rotation and for substantially simultaneously controlling relative rotations between said work gear and said tool about their respective axes in a predetermined timed relationship with each other; the improvement wherein:
said motion control means includes means for adjusting said rotation of the work gear as a function of movement of said tool axis about said generating gear axis so as to maintain said predetermined timed relationship between the tool and work gear.

73. The apparatus of claim 72 the further improvement wherein said theoretical axis of rotation varies in orientation with respect to said base, and said rotation of the work gear is further adjusted as a function of said variation of the theoretical axis with respect to the base so as to maintain said predetermined rolling motion between the tool and work gear.

74. The machine of claim 73 wherein said predetermined rolling motion is further defined as though said work gear were in mesh with a theoretical generating gear rotating about said theoretical axis and having tooth surfaces represented by said stock removing surfaces of the tool.

75. A method of forming longitudinally curved tooth spaces in bevel and hypoid gears using a tool having stock removing surfaces comprising the steps of:
mounting said tool in a tool support;
mounting a work gear in a work gear support;
setting in rotation said tool about an axis which passes through said tool;
setting in rotation said work gear about an axis which passes through said work gear;
relatively moving said tool support with respect to said work support along three rectilinear axes for initially positioning said work and tool supports rectilinearly with respect to each other;
relatively pivoting said work support angularly with respect to said tool support about no more than one pivot axis for initially positioning said work and tool supports angularly with respect to each other; and, substantially simultaneously controlling said rotation of the work gear, said rectilinear movement between the work and tool supports and said pivoting between the work and tool supports so as to operatively engage said tool with said work gear in a predetermined rolling motion between said tool and said work gear about a theoretical axis of rotation that is inclined to said tool axis.

76. The method of claim 75 wherein said theoretical axis of rotation varies in inclination with respect to said pivot axis in the course of said predetermined rolling motion.

77. The method of claim 76 including the step of adjusting said rotation of the work gear as a function of said varying inclination of the theoretical axis with respect to the pivot axis so as to maintain said predetermined rolling motion between the tool and work gear.

78. The method of claim 77 wherein said predetermined rolling motion is defined by said work gear rolling through mesh with a theoretical generating gear rotating about said theoretical axis and having tooth surfaces represented by said stock removing surfaces of the tool.

79. The method of claim 78 including the step of imparting relative rotations between said work gear and said tool about their respective axes in a predetermined timed relationship with each other in the course of said predetermined rolling motion between the tool and work gear.

80. The method of claim 79 including the step of adjusting one of said rotation of the tool and said rotation of the work gear as a function of said varying inclination of the generating gear axis with respect to the pivot axis so as to maintain said predetermined timed relationship between the tool and work gear.

81. The method of claim 80 wherein said step of adjusting one of said rotations includes further adjusting said rotation of the work gear so as to maintain said predetermined timed relationship between the tool and work gear.

82. The method of claim 75 wherein said three rectilinear axes are arranged mutually orthogonal directions, said tool axis being aligned with one of said orthogonal directions and said pivot axis being aligned with another of orthogonal said directions.

83. A method of forming longitudinally curved tooth spaces in bevel and hypoid gears using a tool having stock removing surfaces comprising the steps of:
mounting said tool in a fixed angular orientation with respect to a machine base;
rotating said tool in engagement with a work gear; and
relatively moving said tool with respect to said work gear along three rectilinear machine axes, pivoting said work gear relative to said tool and rotating said work gear on its axis so as to impart a predetermined relative rolling motion between said tool and said work gear as though the work gear were in mesh with a theoretical generating gear having tooth surfaces represented by said stock removing surfaces of the tool and an axis of rotation which is positioned at one or more angular orientations which differ from said fixed angular orientation of the tool.

84. The method of claim 83 wherein said step of relatively moving the tool with respect to the work gear includes relative movements between said tool and work gear with respect to said base in two orthogonal directions which define a plane within which movement of said tool traces a curvilinear path which departs from a circle.

85. The method of claim 84 wherein said generating gear axis varies in orientation with respect to said base.

86. The method of claim 85 including the step of adjusting said rotation of the work gear as a function of said varying orientation of the generating gear axis with respect to the base so as to maintain said predetermined rolling motion between the tool and work gear.

87. The method of claim 86 including the further steps of imparting relative rotations between said work and said tool about their respective axes in a timed relationship with each other, and further adjusting said rotation of the work gear as a function of said varying orientation of the generating gear axis with respect to the base so as to maintain said predetermined timed relationship between the tool and work gear in the course of said predetermined rolling motion between the tool and work gear.

88. A method for making bevel and hypoid gears having longitudinally curved teeth according to an enveloping process, wherein tooth surfaces are defined in a work gear by stock removing surfaces of a tool and relative motions of said tool with respect to said work gear, comprising the steps of:
mounting said tool for rotation in a tool support;
rotating said work gear to a starting position in a work support;
moving said tool support and said work support along three rectilinear axes to said starting position;
pivoting said tool support and work support with respect to each other to said starting position; and, substantially simultaneously controlling said rotation of the work gear, said rectilinear movement between the work and tool supports, and said pivoting between said work and tool supports for moving said stock removing surfaces of the tool in a path of engagement with said tooth surfaces of the work gear angularly with respect to a plane of action between them, thereby defining a theoretical axis of rotation between said tool axis and said work axis to which said tool axis is inclined and which varies in inclination with respect to said pivot axis.

89. The method of claim 88 wherein said path of engagement between the tool and work gear is further defined by a predetermined relative rolling motion between said tool and said work gear as though said work gear were in mesh with a theoretical generating gear rotating about said theoretical axis of rotation and having tooth surfaces represented by said stock removing surfaces of said tool.

90. The method of claim 89 including the step of adjusting said rotation of the work gear as a function of said varying inclination of the generating gear axis with respect to the pivot axis so as to maintain said predetermined rolling motion between the tool and work gear.

91. The method of claim 90 including the further steps of imparting relative rotations between the work gear and said tool about their respective axes in a predetermined timed relationship with each other, and further adjusting said rotation of the work gear as a function of said varying inclination of the generating gear axis with respect to the pivot axis so as to maintain said predetermined timed relationship between the tool and work gear in the course of said predetermined rolling motion between the tool and work gear.

92. The method of claim 88 wherein said work gear is one member of a pair of gears, and said path of engagement between the tool and work gear is further defined by a predetermined relative rolling motion between said tool and said work gear as though said work gear were in mesh with the other member of said pair rotating about said theoretical axis of rotation and having tooth surfaces represented by said stock removing surfaces of said tool.

93. The method of claim 92 wherein said stock removing surfaces of the tool together with said inclination of the tool axis with respect to the axis of the other member are arranged to generate both flanks of tooth spaces in said one member along said path of engagement between the tool and work gear.

94. A method for making gears on a first gear-making machine having N moveable axes for positioning and relatively moving a tool member and a work gear member being formed, said method characterized by the steps of:
- generating signal values for M moveable axes representative of positions and relative movements between said members as is required for forming a predetermined gear using a second gear-making machine having certain of said M axes arranged in the same configuration as certain of said N axes of said first machine, said M axes being a larger number of axes than said N axes;
- transforming said signal values for said M axes into signal values for said N axes; said signal values for said certain of the M axes being different than said signal values for said certain of the N axes arranged in the same configuration; and
- controlling said first gear-making machine in response to said signal values for said N axes to form said predetermined gear from said work gear member.

95. The method of claim 94 wherein said step of signal generating includes generating signal values for said M axes to produce hypoid and bevel gears having longitudinally curved teeth.

96. The method of claim 95 wherein said step of signal generating further includes the step of generating a signal representing an inclination of a tool axis with respect to a cradle axis in the second machine.

97. The method of claim 96 wherein said step of signal generating further includes the step of generating a signal representing movements of said inclined tool axis about said cradle axis for imparting a relative rolling motion between said tool member and said work gear member in the second machine.

98. The method of claim 97 wherein said N axes equals six movable machine axes and said M axes equals at least nine movable axes.

99. The method of claim 98 wherein said N axes include a tool axis, a work axis, three rectilinear axes for translating said tool and work axes with respect to each other and one pivot axis for pivoting said tool and work axis with respect to each other.

100. A method of generating longitudinally curved tooth spaces in bevel and hypoid gears with a computer controlled machine having a plurality of computer controlled axes for positioning and operatively engaging a tool with a work gear characterized by the steps of:
- machine determining initial setup positions of said computer controlled axes based on setup parameters of differently configured axes of a conventional bevel and hypoid generating machine of the type including a cradle rotatable about a cradle axis, a tool support having a tool axis adjustably mounted on said cradle for inclining said tool axis with respect to said cradle axis and a work support having a work axis;
- moving said computer controlled axes to said initial setup positions for initially positioning said tool and work gear with respect to each other;
- machine determining further operating positions of said computer controlled axes based on operating parameters which relate to relative movements of said differently configured axes of the conventional machine;
- moving said computer controlled axes to said further operating positions for operatively engaging said tool with said work gear, said tool and said work gear assuming positions in the computer controlled machine thereby which differ from those positions that would be effected by the differently configured axes in the conventional machine but said tool and said work gear remaining in the same relative positions with respect to each other as they would in the conventional machine; and,
- repeating said steps of machine determining further operating positions and moving said computer controlled axes to said further operating positions for completing the generating operation.

101. The method of claim 100 wherein said operating parameters include values for rotating a tool about said cradle axis together with a work gear about said work axis according to a predetermined rolling motion in the conventional machine.

102. The method of claim 101 wherein said setup parameters include values for inclining said tool axis with respect to said cradle axis of the conventional machine.

103. The method of claim 102 wherein said steps of machine determining setup and operating positions include the step of performing a coordinate transformation into a coordinate system within which said tool axis and said work gear axis may be relatively located by measures along three rectilinear axes and one pivot axis in the computer controlled machine.

104. The method of claim 103 wherein said coordinate transformation provides for varying a reference position of said cradle axis of the conventional machine in the computer controlled machine.

105. The method of claim 104 wherein said steps of moving said computer controlled axes include the steps of moving three of said axes in rectilinear directions and moving no more than one of said axes about said pivot axis.

106. The method of claim 105 wherein said step of moving said computer controlled axes to further operating positions includes rotating said work gear in the computer controlled machine at a different rate than the work gear would be rotated in the conventional machine to compensate for said varying reference position of said cradle axis of the conventional machine in the computer controlled machine.

107. A method of forming longitudinally curved tooth spaces in bevel and hypoid gears, using a flared cup grinding wheel having stock removing surfaces, characterized by the steps of:
- rotating said flared cup grinding wheel about a wheel axis passing through said grinding wheel in a fixed angular orientation with respect to a machine base;

imparting a relative rocking motion between said grinding wheel and a work gear along the length of said tooth spaces in the work gear about a first theoretical axis of rotation, defined by said rocking motion, that is inclined to said wheel axis;

imparting a relative rolling motion between said grinding wheel and said work gear about a second theoretical axis of rotation, inclined to both said first theoretical axis and said wheel axis, corresponding to an axis of rotation of a theoretical generating gear rolling in mesh with said work gear and having tooth surfaces represented by said stock removing surfaces of the grinding wheel, together with said rocking motion of said grinding wheel along the length of said tooth spaces.

108. The method of claim 107 wherein said steps of imparting rocking and rolling motion include moving said work axis angularly with respect to said grinding wheel axis about no more than one pivot axis that is mounted in a fixed angular orientation with respect to the machine base.

109. A computer processor for controlling a bevel and hypoid gear generating machine for generating longitudinally curved gears using a tool having stock removing surfaces projecting from a front face thereof, said computer processor comprising:

means for controlling rotation of said tool about a tool axis;

means for controlling rotation of a work gear about a work axis;

means for controlling movement between said tool and said work gear along three rectilinear axes;

means for controlling angular movement between said tool axis and said work axis about a pivot axis;

means for substantially simultaneously controlling said rotation of the work gear, said rectilinear movements between the tool and work gear, and said angular movement between the tool and work axes for imparting a predetermined relative rolling motion between said tool and said work gear about a theoretical axis of rotation that is inclined to said tool axis and describes a relative movement of said tool along a path inclined to a line of action between the tool and work gear defined by a locus of points of contact between the tool and work gear.

110. The computer processor of claim 109 wherein said path of engagement between the tool and work gear is further defined by the predetermined rolling motion between the tool and work gear as though the work gear were in mesh with a theoretical generating gear having an axis of rotation coincident with said theoretical axis and tooth surfaces represented by said stock removing surfaces of the tool.

111. The computer processor of claim 110 wherein said generating gear axis varies in angular orientation with respect to said pivot axis in the course of said predetermined rolling motion.

112. The computer processor of claim 111 including means for adjusting said rotation of the work gear as a function of said varying angular orientation of the generating gear axis so as to maintain said predetermined rolling motion between the tool and work gear.

113. A computer processor for controlling a bevel and hypoid gear generating machine having a plurality of computer controlled axes for positioning and operatively engaging a tool with a work gear, said computer processor characterized by:

means for determining initial setup positions of said computer controlled axes based on setup parameters of differently configured axes of a conventional bevel and hypoid gear generating machine of the type including a cradle rotatable about a cradle axis, a tool support having a tool axis adjustably mounted on said cradle for inclining said tool axis with respect to said cradle axis and a work support having a work axis; and, means for determining further operating positions of said computer controlled axes based on operating parameters which relate to relative movements of said differently configured axes of the conventional machine;

said further operating means providing for performing a coordinate transformation for relating operating positions which would be effected by said conventional machine axes to said further operating positions of the computer controlled axes.

114. The computer processor of claim 113 wherein said operating parameters include values for rotating a tool about said cradle axis together with a work gear about said work axis according to a predetermined rolling motion in the conventional machine.

115. The computer processor of claim 114 wherein said setup parameters include values for inclining said tool axis with respect to said cradle axis in the conventional machine.

116. The computer processor of claim 115 wherein said operating positions that would be effected by the conventional machine axes are referenced in a coordinate system attached to said cradle axis of the conventional machine and transformed into a second coordinate system within which positions of said tool axis and said work axis may be relatively located by measures along three rectilinear axes and about one pivot axis.

117. The computer processor of claim 116 wherein said further operating means also provides for varying a reference position of said cradle axis within said second coordinate system.

* * * * *